INVENTOR.
HARRY W. MOORE
BY
HIS ATTORNEYS

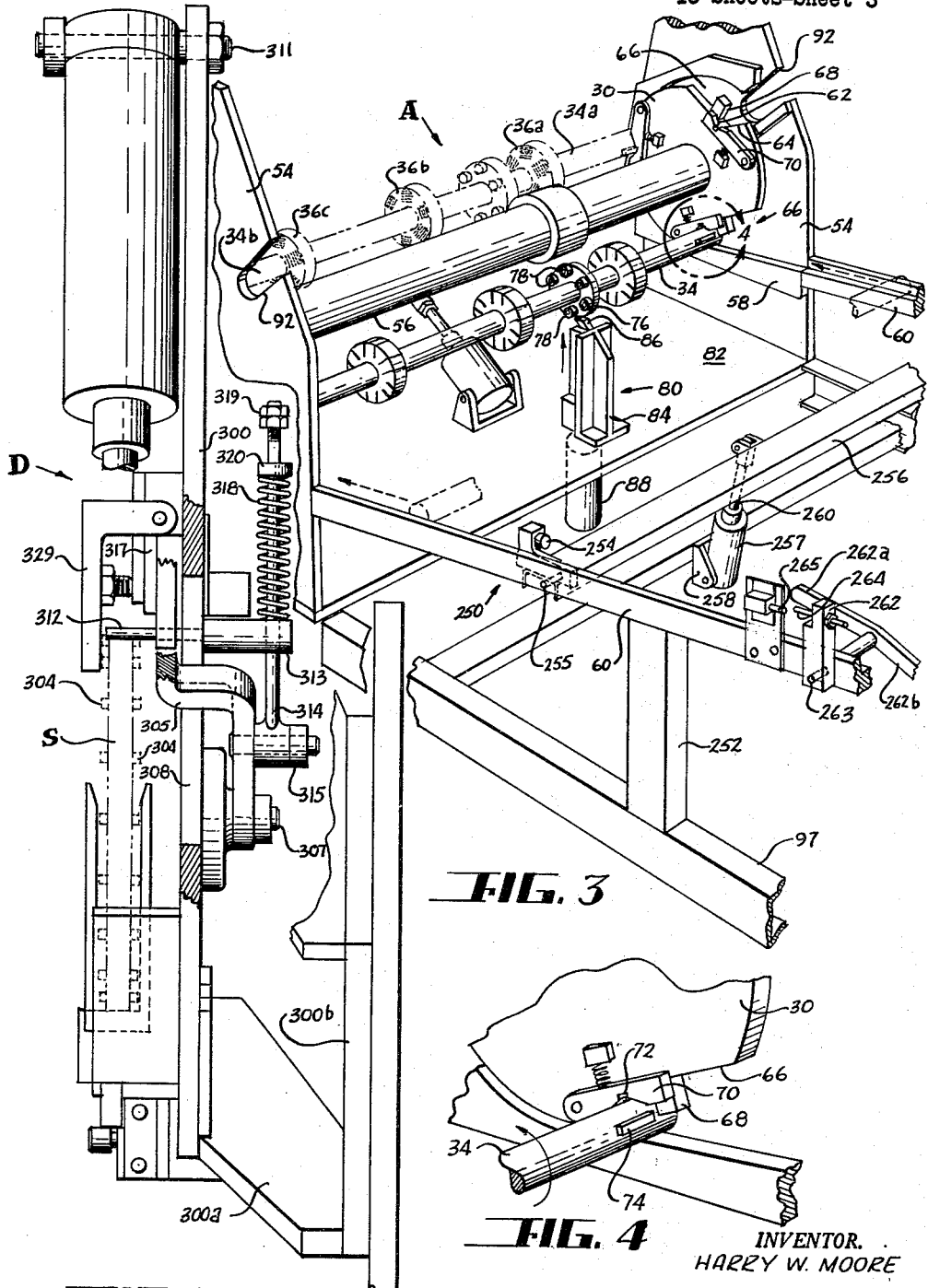

July 6, 1965      H. W. MOORE      3,192,961
AUTOMATIC STATOR WINDING MACHINE AND PROCESS
Filed Feb. 16, 1961      13 Sheets-Sheet 4
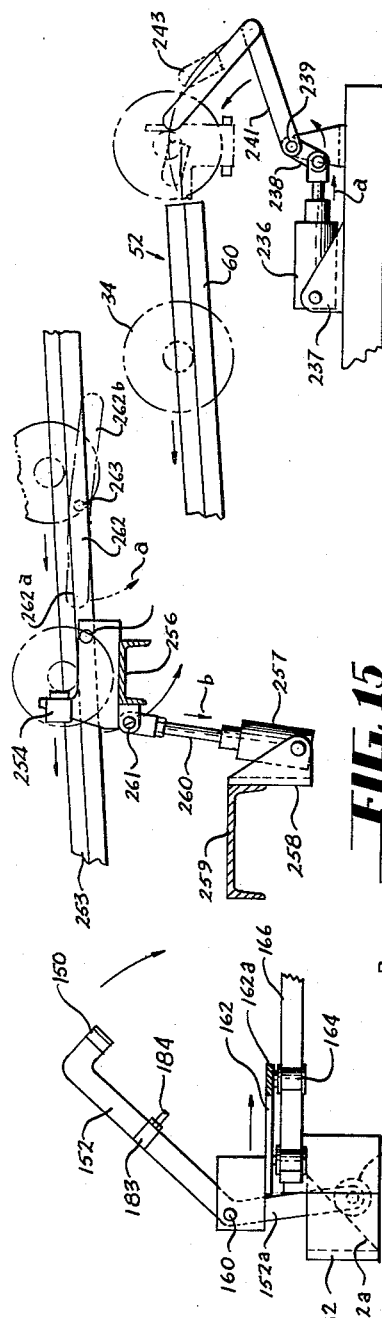
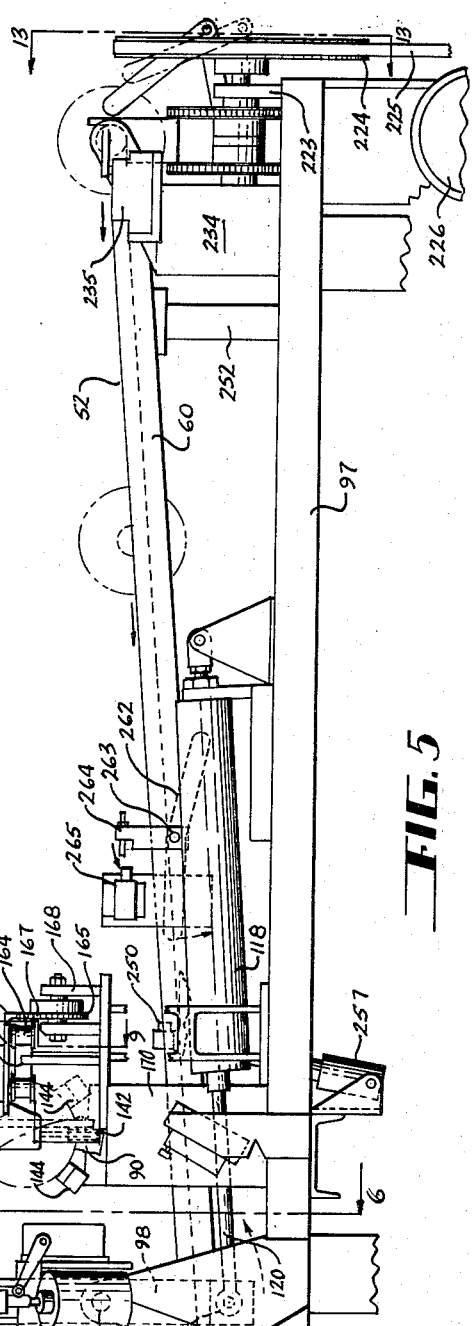
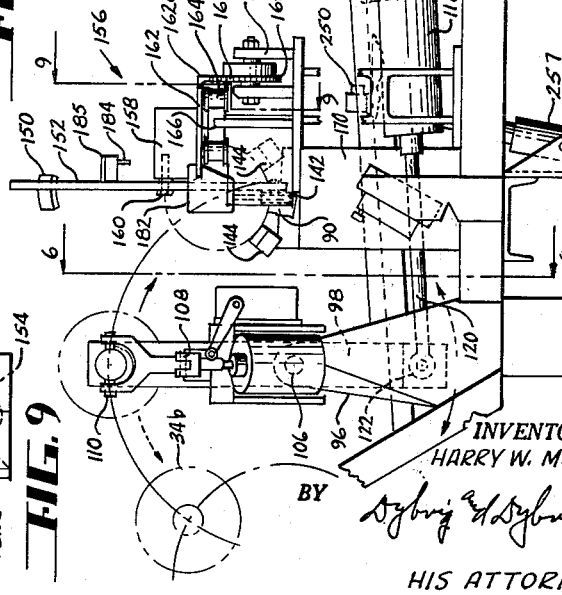
INVENTOR.
HARRY W. MOORE
BY
HIS ATTORNEYS

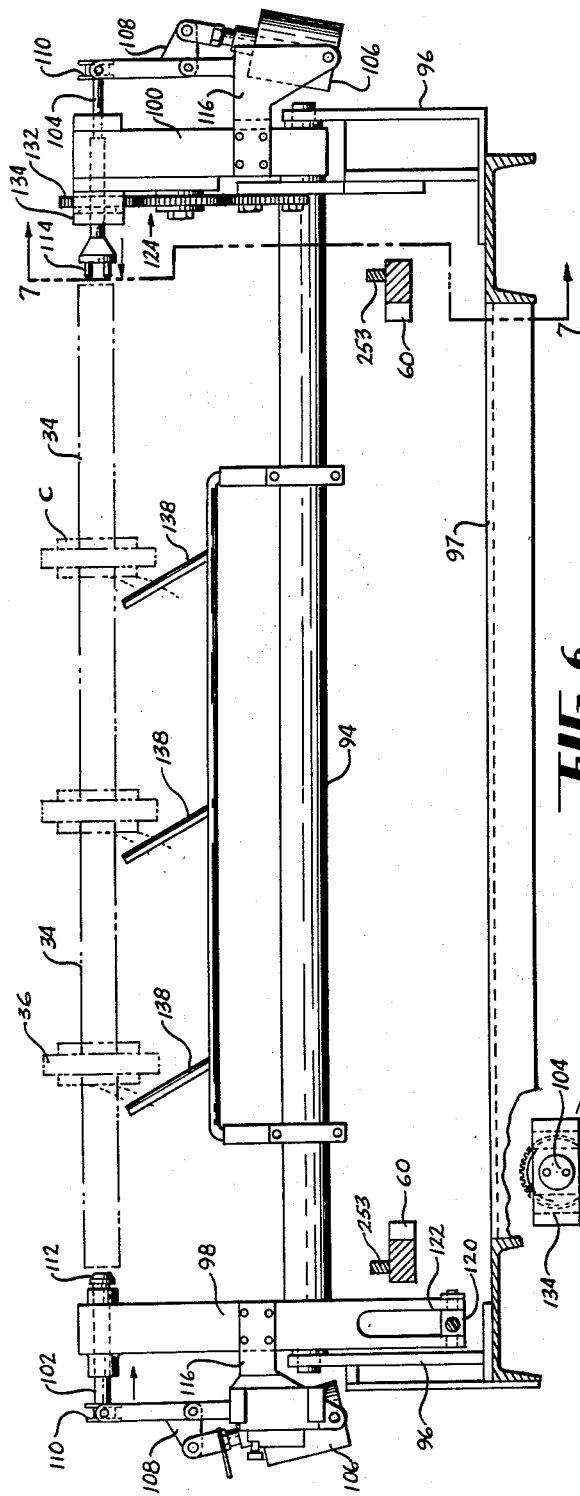

July 6, 1965  H. W. MOORE  3,192,961
AUTOMATIC STATOR WINDING MACHINE AND PROCESS
Filed Feb. 16, 1961  13 Sheets-Sheet 6
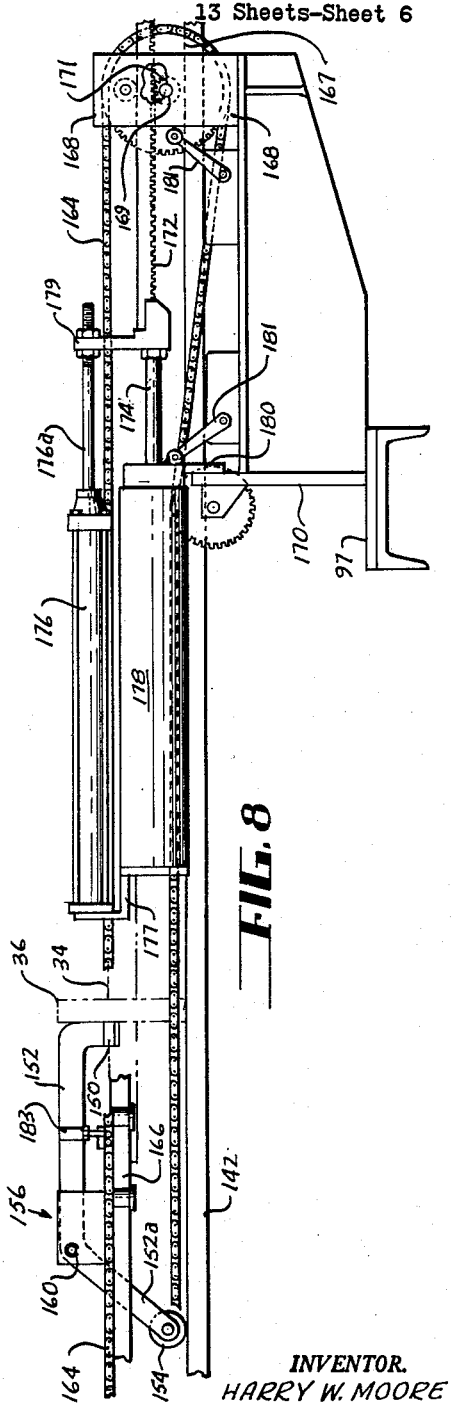
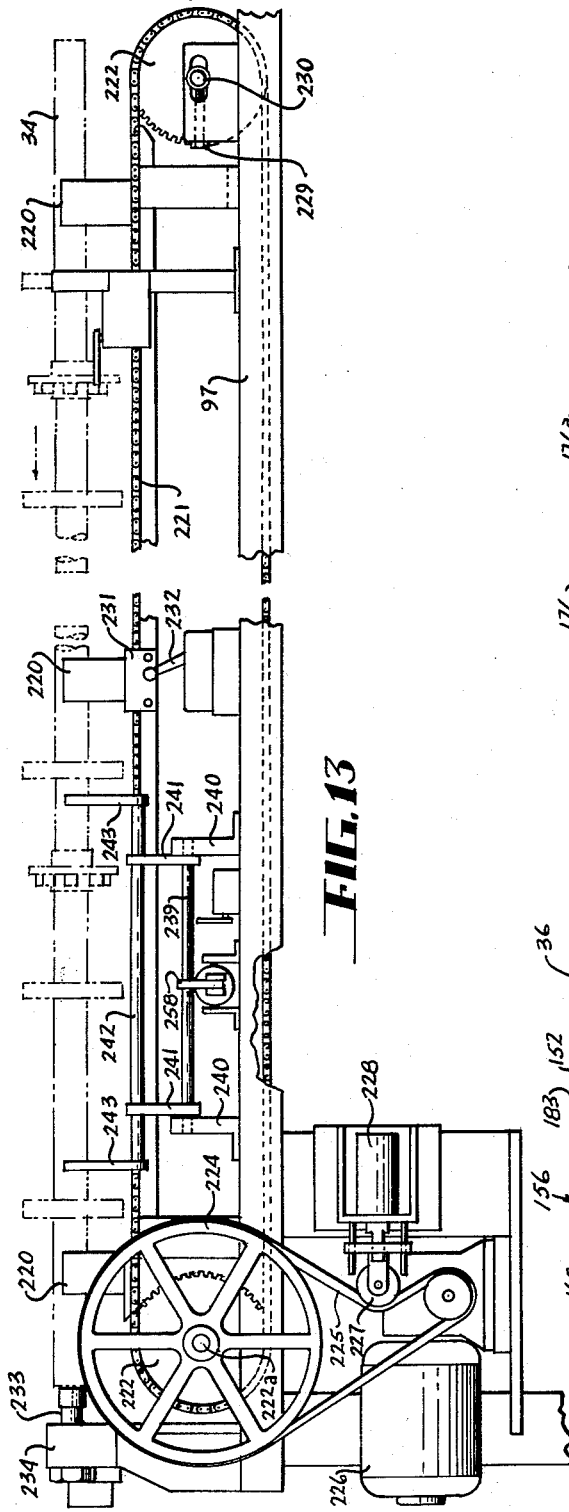
INVENTOR.
HARRY W. MOORE
BY
HIS ATTORNEYS

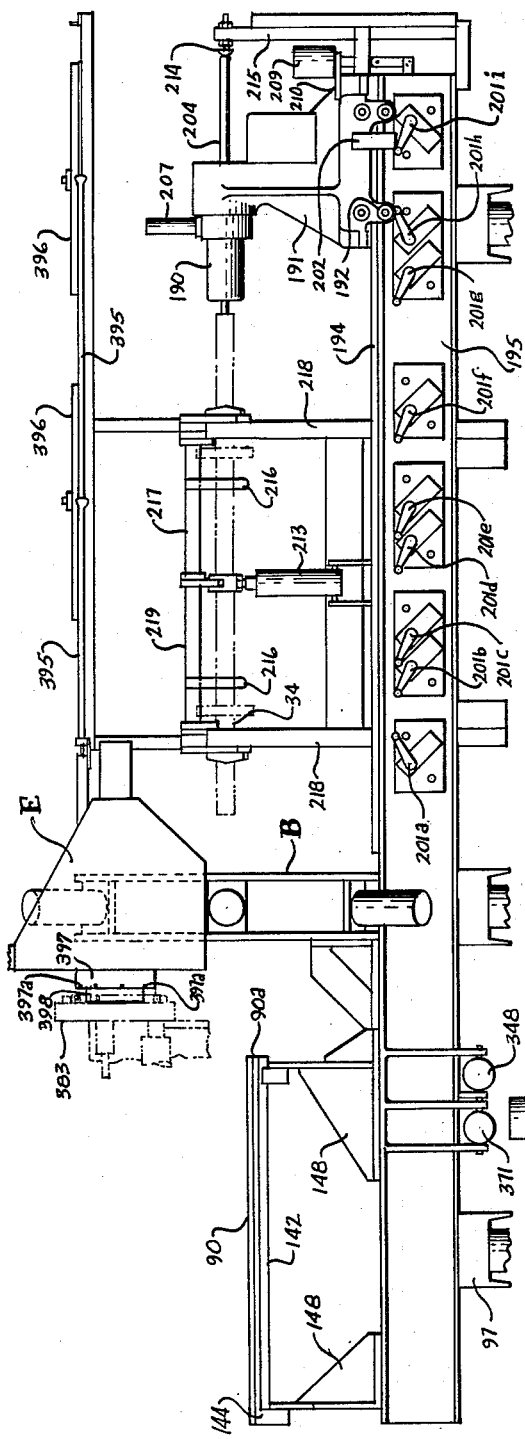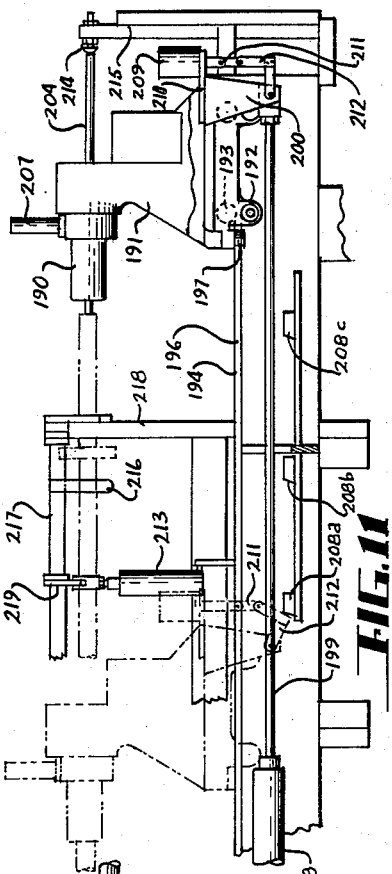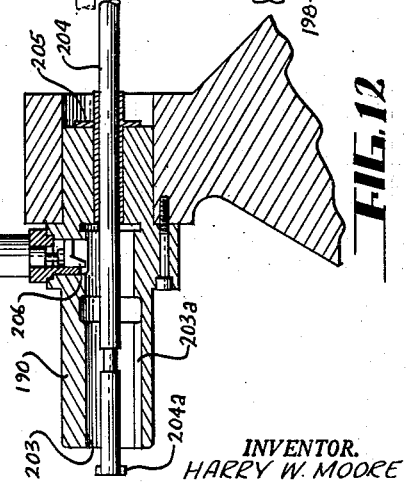

INVENTOR.
HARRY W. MOORE

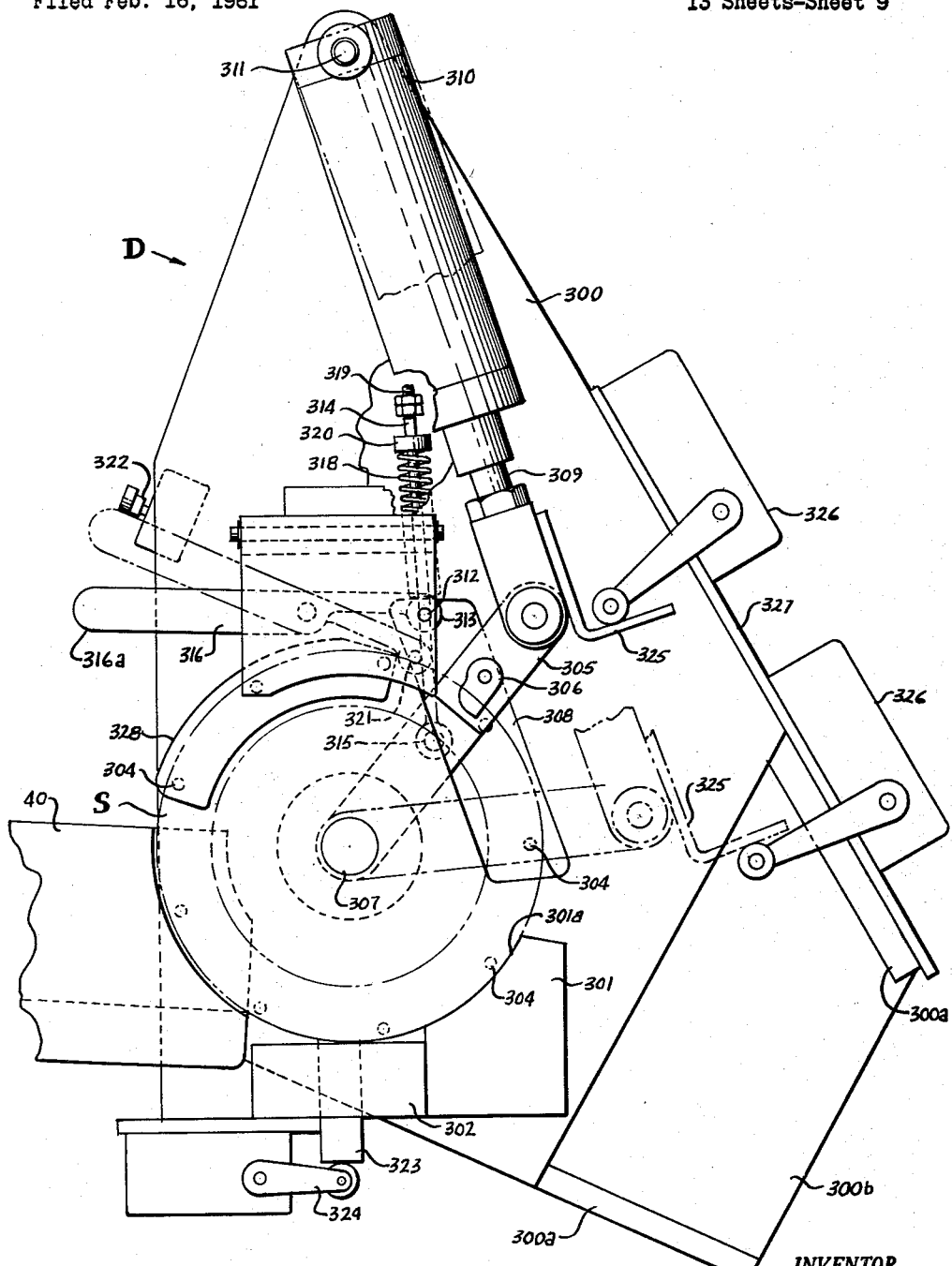

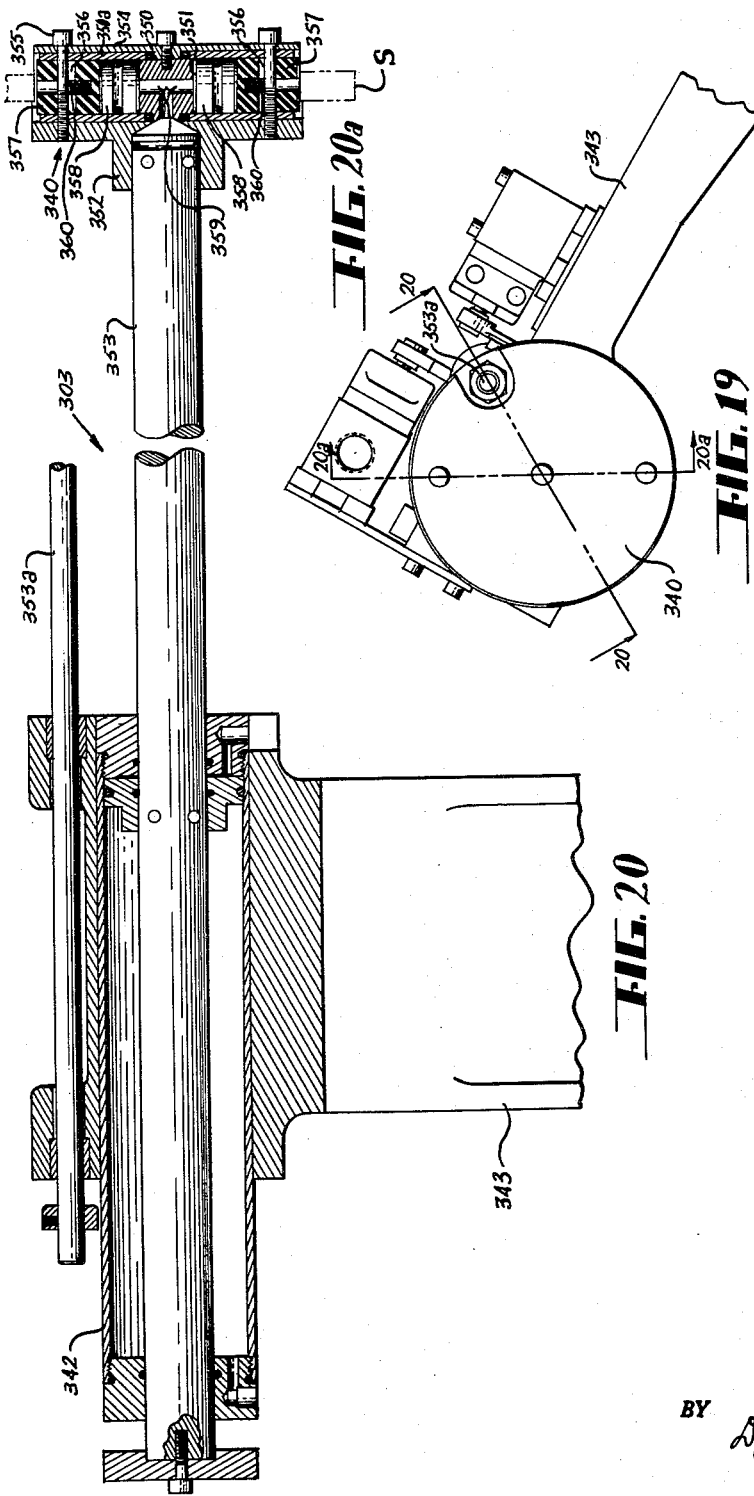

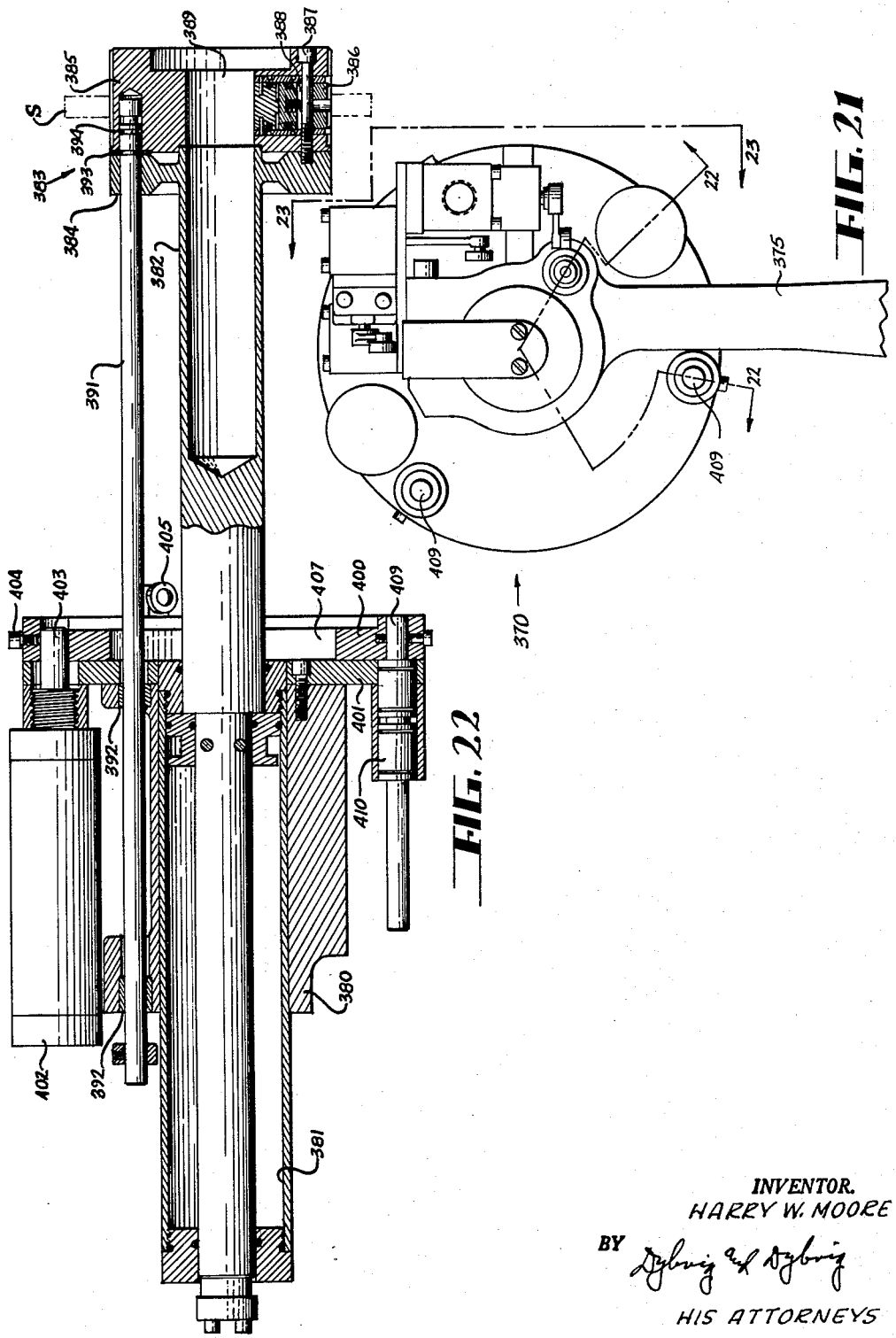

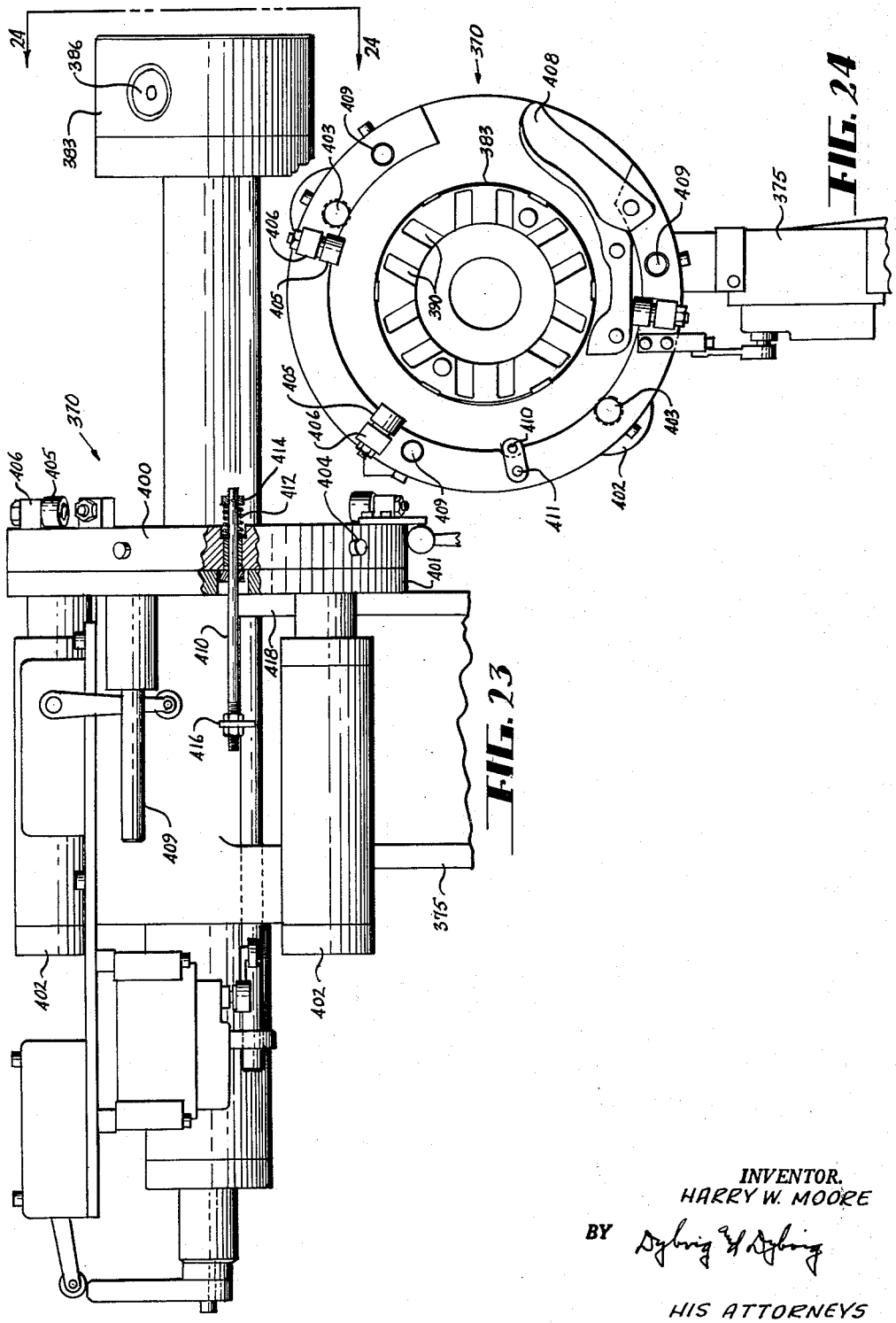

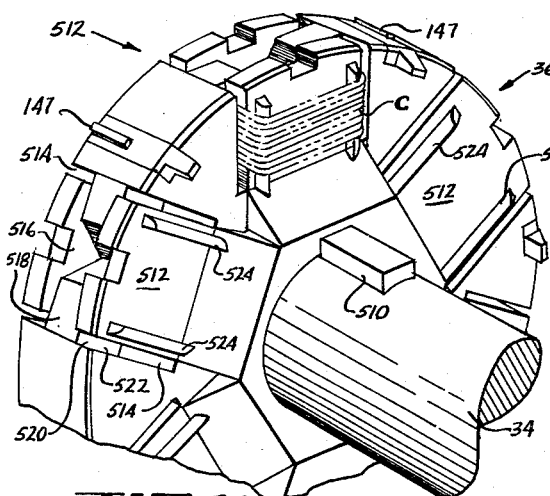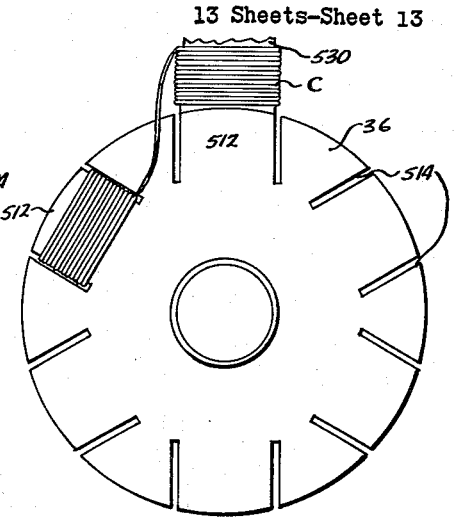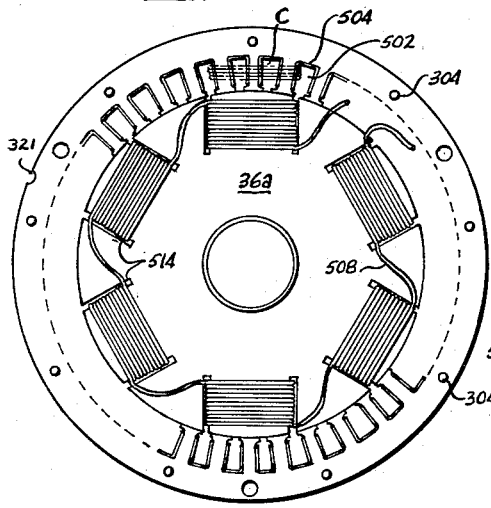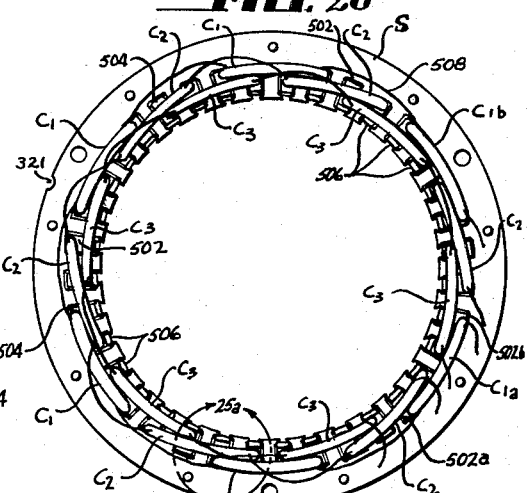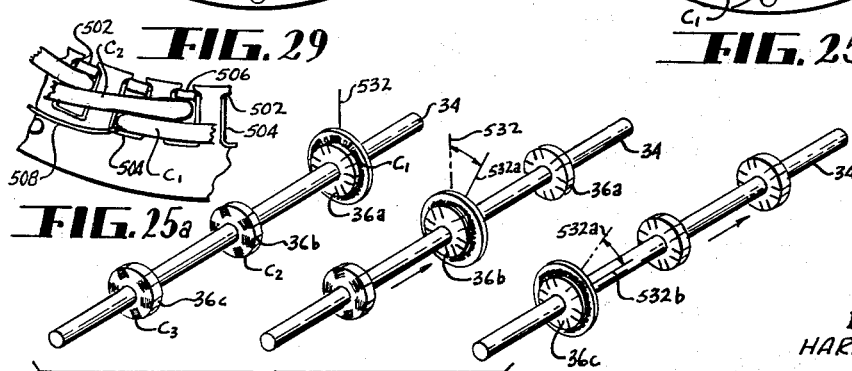
INVENTOR.
HARRY W. MOORE
BY
HIS ATTORNEYS

United States Patent Office 3,192,961
Patented July 6, 1965

3,192,961
AUTOMATIC STATOR WINDING MACHINE
AND PROCESS
Harry W. Moore, 5051 Kittridge Road, Dayton, Ohio
Filed Feb. 16, 1961, Ser. No. 89,804
23 Claims. (Cl. 140—92.1)

This invention relates to a system for mass producing stators. More particularly, this invention relates to a coil winding process and machine utilizing a dummy field member into which coils are deposited, the coils subsequently being transferred from the dummy field member to a stator frame. The stator so produced has a novel arrangement of coils. It is to be understood that the invention is not necessarily so limited. The term "stator" is used herein for convenience. The invention will be described with reference to a stator for a rotating-field alternator. Those skilled in the art will realize, however, that the invention disclosed herein may be used to provide any of numerous electro-magnetic devices with field or current carrying coils.

An object of this invention is to provide an improved process for winding stators.

Another object of this invenition is to provide a stator having a novel arrangement of current carrying coils.

Another object of this invention is the provision of automatically and continuously operable mechanisms for the mass production of stator assemblies.

The coil winding process described herein utilizes one or more dummy field members mounted upon an arbor, the dummy field members having coil-receiving slots which are loaded with coils by a coil winding machine. After the dummy field members have been loaded with coils, the arbor is transferred to a coil transferring machine operable to pull the coils from the dummy field members into the coil-receiving slots in a stator frame. Subsequently, the stator frame is moved from the coil winding machine to a wedge inserting machine which inserts coil retaining and insulating wedges into the stator slots. The stator frame provided with coils and wedges is then placed in a coil former. The function of the coil former is to flatten or squeeze the coils on the stator frame into a predetermined shape for use in an alternator, motor or the like.

A more specific object of this invention is the provision of automatically operable conveying mechanisms capable of rapidly and accurately conveying a dummy field member from a coil winding machine to a coil transferring machine while simultaneously transferring a stator through various stages of assembly.

Other objects and advantages reside in the construction of parts, the combination thereof, the method of manufacture and the mode of operation, as will become more apparent from the following description.

Referring to the drawings:

In FIGURE 1 and in many other figures, portions of the machine are broken away or omitted to disclose details thereof.

FIGURES 3 through 15 disclose details of the mechanism for conveying and positioning arbors having dummy field members from the coil winding machine to the coil transferring machine and back to the coil winding machine. Specifically:

FIGURE 3 is a perspective view of a portion of the coil winding machine including mechanism to index the arbors and a portion of a ramp used in conveying arbors to the winding machine.

FIGURES 4 is an enlarged perspective view of a portion of the winding machine enclosed within the circular line 4 of FIGURE 3.

Figure 1:
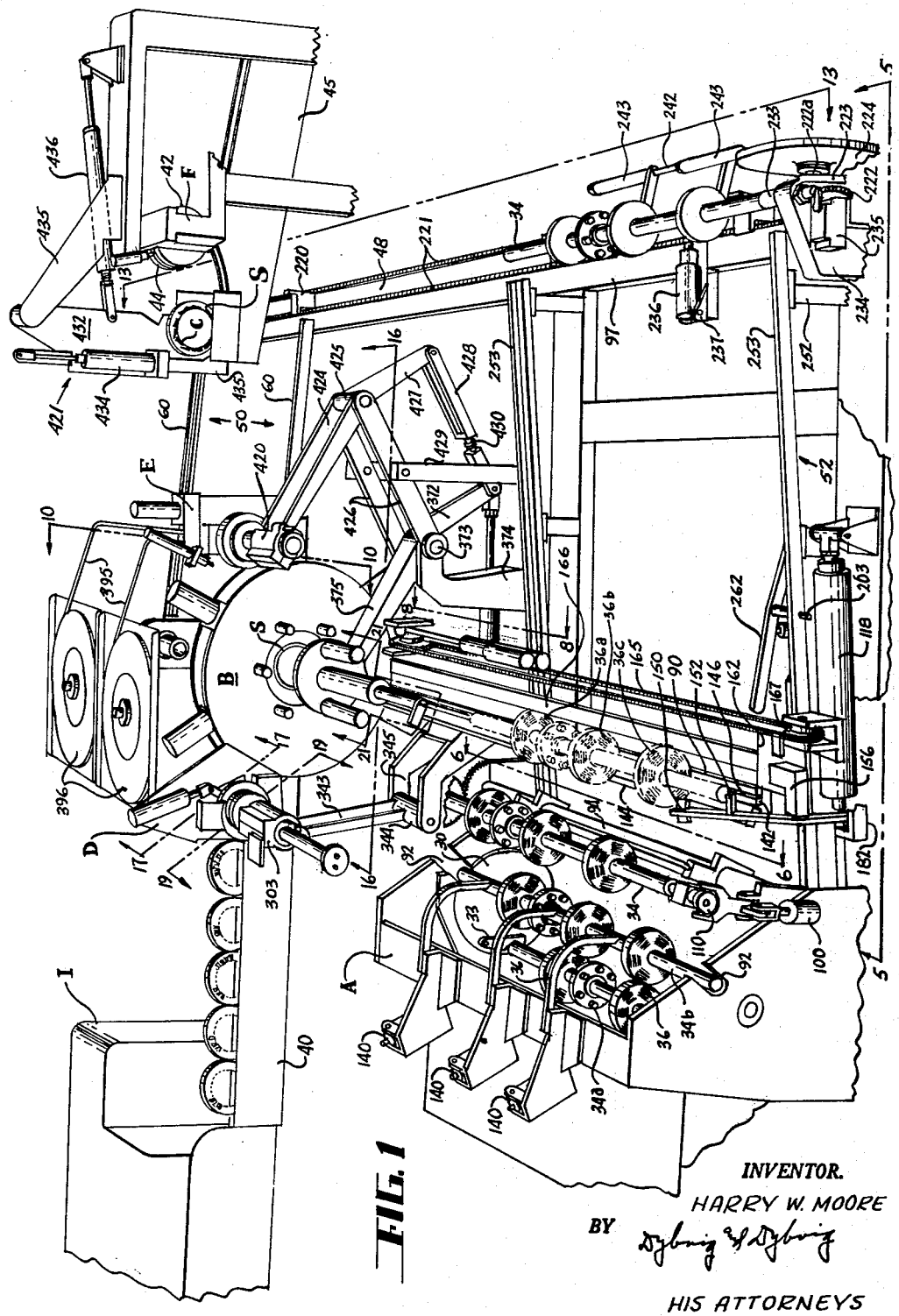
FIGURE 1 is a perspective view of an automatic stator assembling machine made in accordance with this invention.

FIGURE 5 is an end view of the stator assembling machine as viewed in the direction of the lines 5—5 of FIGURE 1 and shows a portion of the apparatus for transferring arbors from the coil winding machine to a guide track, an end view of a car used to move the arbor from the winding machine to the coil transferring machine and a side view of the return ramp shown in FIGURE 3.

FIGURE 6 is an elevational view of the apparatus for transferring the arbor from the winding machine to the guide track as viewed in the direction of arrows 6—6 of FIGURES 1 and 5.

FIGURE 7 is an elevational view of a portion of an arbor depositing arm, as viewed in the direction of arrows 7—7 in FIGURE 6.

FIGURE 8 is an elevational view of a portion of the guide track and mechanism for conveying the arbor from the winding machine to the coil transferring machine along the guide track, as viewed in the direction of the arrows 8—8 of FIGURE 1.

FIGURE 9 is an elevational view of the car and an associated pivoted arm forming a portion of the mechanism of FIGURE 8 when positioned at one end of the guide track, as viewed in the direction of arrows 9—9 in FIGURE 5.

FIGURE 10 is an elevational view, as viewed in the direction of arrows 10—10 of FIGURE 1, illustrating a portion of the arbor conveying mechanism including a tailstock used in indexing the arbor through and beyond the coil transferring machine.

FIGURE 11 is an elevational view with portions broken away of a portion of the apparatus illustrated in FIGURE 10.

FIGURE 12 is a cross sectional view of the tailstock shown in FIGURES 10 and 11.

FIGURE 13 is an elevational view of mechanism used in returning the empty arbor from the coil transferring mechanism to the winding machine as viewed in the direction of arrows 13—13 in FIGURES 1 and 5.

FIGURE 14 is a side view of a mechanism used to place an arbor onto a return ramp and constitutes a side view of a portion of the mechanism shown in FIGURE 13.

FIGURE 15 is a partial sectional view of a stop or brake mechanism used in association with the return ramp.

Figure 16:
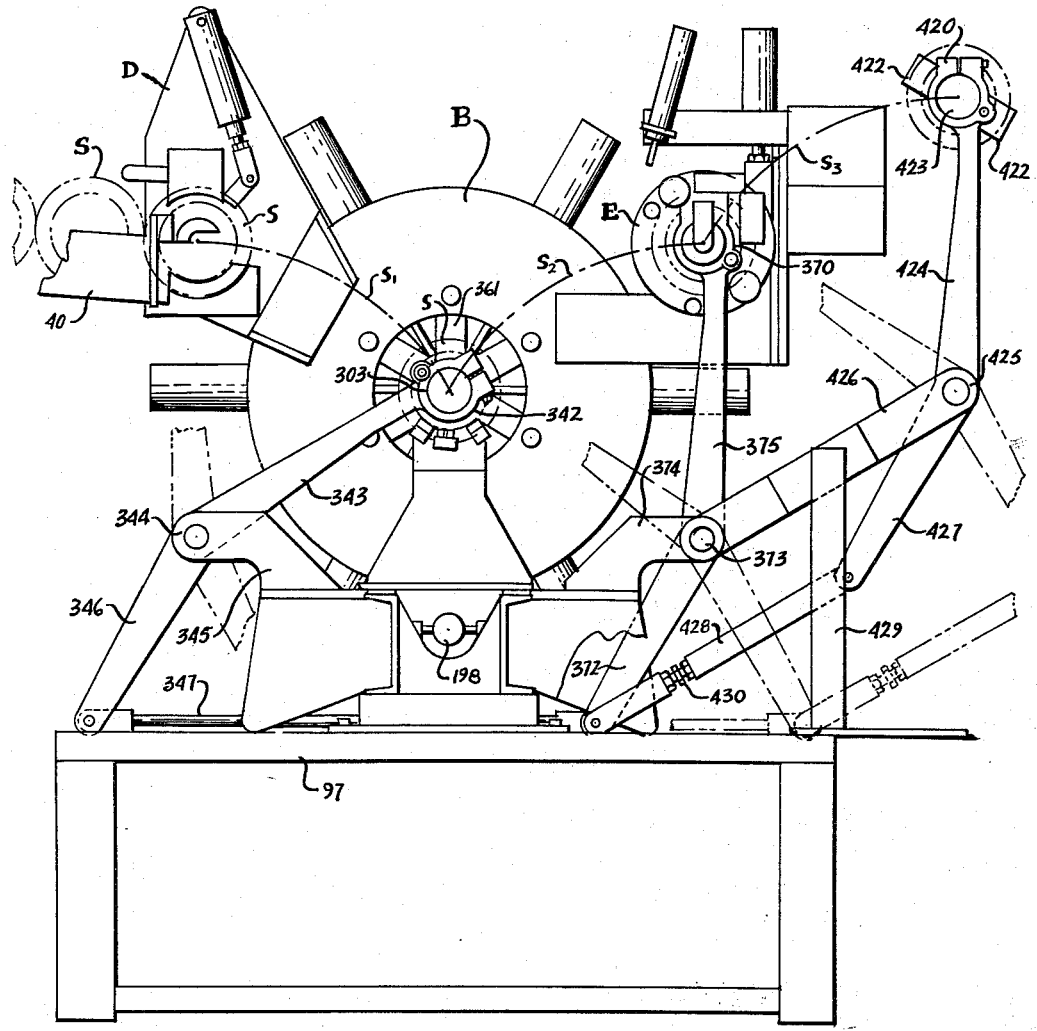

FIGURES 16 through 24 show details of the mechanisms for conveying and positioning the stator frames. Specifically:

FIGURE 16 is a front elevational view of the stator frame conveying and positioning mechanisms as viewed in the direction of arrows 16—16 of FIGURE 1.

FIGURE 17 is an elevational view of a stator indexing mechanism as viewed in the direction of arrows 17—17 of FIGURE 1.

FIGURE 18 is a side view of the indexing mechanism shown in FIGURE 17.

FIGURE 19 is an elevational view of a first transfer head used to convey a stator frame from the stator indexing mechanism to the coil transferring machine as viewed in the direction of arrows 19—19 of FIGURE 1.

FIGURE 20 is a cross sectional view of a portion of the first transfer head taken along lines 20—20 of FIGURE 19.

FIGURE 20a is a cross sectional view of another portion of the first transfer head taken along lines 20a—20a of FIGURE 19.

FIGURE 21 is a rear view of a second movable transfer head, as viewed in the direction of lines 21—21 of FIGURE 1, used to convey a stator frame from the coil transferring machine to the wedge inserting machine.

FIGURE 22 is a cross sectional view of the second transfer mechanism taken along the lines 22—22 of FIGURE 21.

FIGURE 23 is a side view of the second transfer head as viewed in the direction of arrows 23—23 of FIGURE 21.

FIGURE 24 is a front view of the second transfer mechanism as viewed in the direction of arrows 24—24 of FIGURE 23.

FIGURE 25 is an elevational view of a completed stator assembly provided with a three phase winding in accordance with the process and mechanism described herein.

FIGURE 25a is an enlarged view of a portion of the stator within the arcuate line 25a in FIGURE 25.

FIGURE 26 is a partial perspective view of a dummy member used for accumulating coils and transferring coils from the coil winding machine to the coil transferring machine.

FIGURE 27 is a schematic perspective view illustrating the manner in which the dummy members are indexed through a stator frame and the coils transferred from the dummy members to the stator frame.

FIGURE 28 is a schematic view illustrating a coil of wires being wound upon a coil form and another coil of wires transferred from the coil form to coil receiving slots in a dummy member.

FIGURE 29 is a schematic view illustrating the relationship between the coil-receiving slots in a dummy member and the stator slots.

STATOR AND METHOD

Referring to FIGURES 25 and 25a, which show a ring-shaped stator frame S having thirty-six inwardly directed slots 502, the coils for a twelve pole, three phase alternator may be arranged as follows.

Six coils C1 form the first phase. These lie in the bottom of equally spaced pairs of slots 502. Thus, each coil C1 straddles two slots 502 and is separated from the immediately adjacent coils C1 by two slots. Six coils C2 form the second phase windings. These are similarly equally spaced about the circumference of the stator. However, these coils must be displaced by 120 electrical degrees, or 20 mechanical degrees, from the first phase coils. Since there are thirty-six slots, the distance between the slots is 10°. Accordingly, the ends of the coils C2 are deposited a distance of two slots away from the corresponding ends of the coils C1. Therefore, one end of each coil C2 overlies a portion of a coil C1, while the other end of each coil C2 lies in the bottom of a slot 502. Six coils C3, forming the third phase, are then deposited such that their ends are displaced by 240 electrical degrees from the corresponding ends of the C1 coils. This involves a shift in position of 40 mechanical degrees from the C1 coils. Accordingly, one end of each coil C3 overlies a coil C2 while the other end overlies a coil C1.

The coils may be separated from the stator slots 502 by insulating strips 504 snugly retained within each of the stator slots 502. To further insulate the coils from the stator frame and to retain the coils within the stator slots, strips of coil retaining wedges 506 are inserted within the top, that is the radially innermost portion, of the stator slots 502.

The coils C1 forming the first phase are wound from a continuous strand or supply of wire. The coils C2 and C3 are similarly wound from continuous strands of wire. The coils forming each phase are thus interconnected by lead wires 508, but the windings for the three phases are separate. In the past, following well known prior art practice, the adjacent coils of each phase, such as coils C1a and C1b in FIGURE 25, would normally be reversely wound and the sides of the adjacent coils would overlap within a stator slot. The overlapping sides of two adjacent coils would form a single pole. There thus would be as many coils as poles in each phase. However, in accordance with this invention, the coils C1a and C1b along with the remaining C1 coils are wound in the same direction and the sides of adjacent C1 coils do not overlap. Since the coils are wound in the same direction, the currents induced in the coils will flow through all the coil conductors in the same direction. Accordingly, alternate poles will be formed at the sides of each coil that pass through the stator slots 502. Thus referring to the coil C1a in FIGURE 25, the conductors in the coil sides passing through the stator slot designated 502a may be said to form one pole while the conductors passing through the slot designated 502b form another, opposed pole. In other words, each C1 coil *side* provides a pole and there is one C1 coil for each pair of poles. Accordingly, rather than the six coils C1 forming six poles, the six C1 coils form twelve poles. Since only one-half the usual number coils are used in this construction, each coil must contain twice the number of turns per coil used in the past for the same current requirements.

As noted before, each coil C1 straddles two slots 502 and is separated from the immediately adjacent coils C1 by two slots. Thus, each coil C1 spans four slots. Each of the C2 and C3 coils similarly span four slots. Since the coils C2 and C3 are spaced from the coils C1 by 120 electrical degrees and 240 electrical degrees, respectively, or in other words 20 and 40 mecahnical degrees respectivly, there is one coil side in each stator slot 502. Of course, the six coils C for each phase must be equally spaced by 60° about the circumference of the stator. This information may be advantageously used when designing other three phase stators having different numbers of poles. For example, an eight pole, three phase stator made in accordance with the scheme outlined above would employ four coils for the first phase spaced equally by 90° about the circumference of the stator frame. Again the coil span could be four slots. The coils forming the second and third phases would be similarly disposed but shifted 120 electrical degrees and 240 electrical degrees respectively from the first set of coils. Since there are three sets of coils for the three phases, each set comprising four coils, there are twelve coils altogether. These twelve coils would be placed into a stator frame containing twenty-four slots. Similarly, for a sixteen pole, three phase stator, there would be eight coils for each phase equally circumferentially spaced at 45° intervals about a stator frame having forty-eight coil-receiving slots.

The arrangement of coils in the stator slots described above lends itself to a novel method of mechanical insertion of coils. Rather than winding the coils C1, C2 and C3 directly on the stator frame S, the coils are first deposited on a plurality of dummy field members 36 (see FIGURES 26, 27 and 28), there being one member 36 for each phase. Thus, for winding the twelve pole, three phase stator described above, three cylindrical mandrels or dummy members 36a, 36b and 36c are fixedly attached to a common arbor 34 as by means of keys 510 (FIGURE 26). Each dummy field member 36 has six coil receiving portions 512 equally spaced about its periphery. The coil-receiving portions 512 on each of the members 36a, 36b and 36c are aligned one behind the other.

Each coil-receiving portion 512 is defined on its sides by a pair of parallel coil-receiving slots 514, each pair of parallel slots 514 being parallel to the radius extending between the slot pair. The coils C1 are deposited in the member 36a, the coils C2 in the member 36b and the coils C3 in the member 36c. The center of each portion 512 is cut out to form a cavity 516 in which a pair of blocking plates 518 are pivotally mounted. The blocking plates 518 are spring biased by means, not shown in the drawings but described in detail in my copending application, Serial No. 48,081, filed in the United States Patent Office August 8, 1960, entitled "Coil Winding Machine," whereby a flange 520 on each plate projects over its adjacent slot 514 near the periphery of the dummy member. The lower faces of the flanges 520 are sloped downwardly and inwardly to the center of the coil-receiving portion 512 to provide a cam surface 522. As a coil is removed from the portion 512, the top surface of the coil cams the blocking plates 516 out of position. Thus, while the blocking plates 516 are biased to hold the coils within the slots 514, the plates may easily be pivoted to open the slots when it is desired to remove the coils. A pair of spacer bars 524 are located on each side of each coil-receiving portion 512 adjacent the coil-receiving slots 514. The spacer bars 524 provide a gap between a coil loaded in the slots 514 and the sides of the coil-receiving portions 512. When it is desired to remove a coil from the dummy member, as will be described below, mechanical fingers may approach the coil near the center of the dummy member and extend underneath the coil between the coil and the sides of the coil-receiving portion 512.

Figure 2:
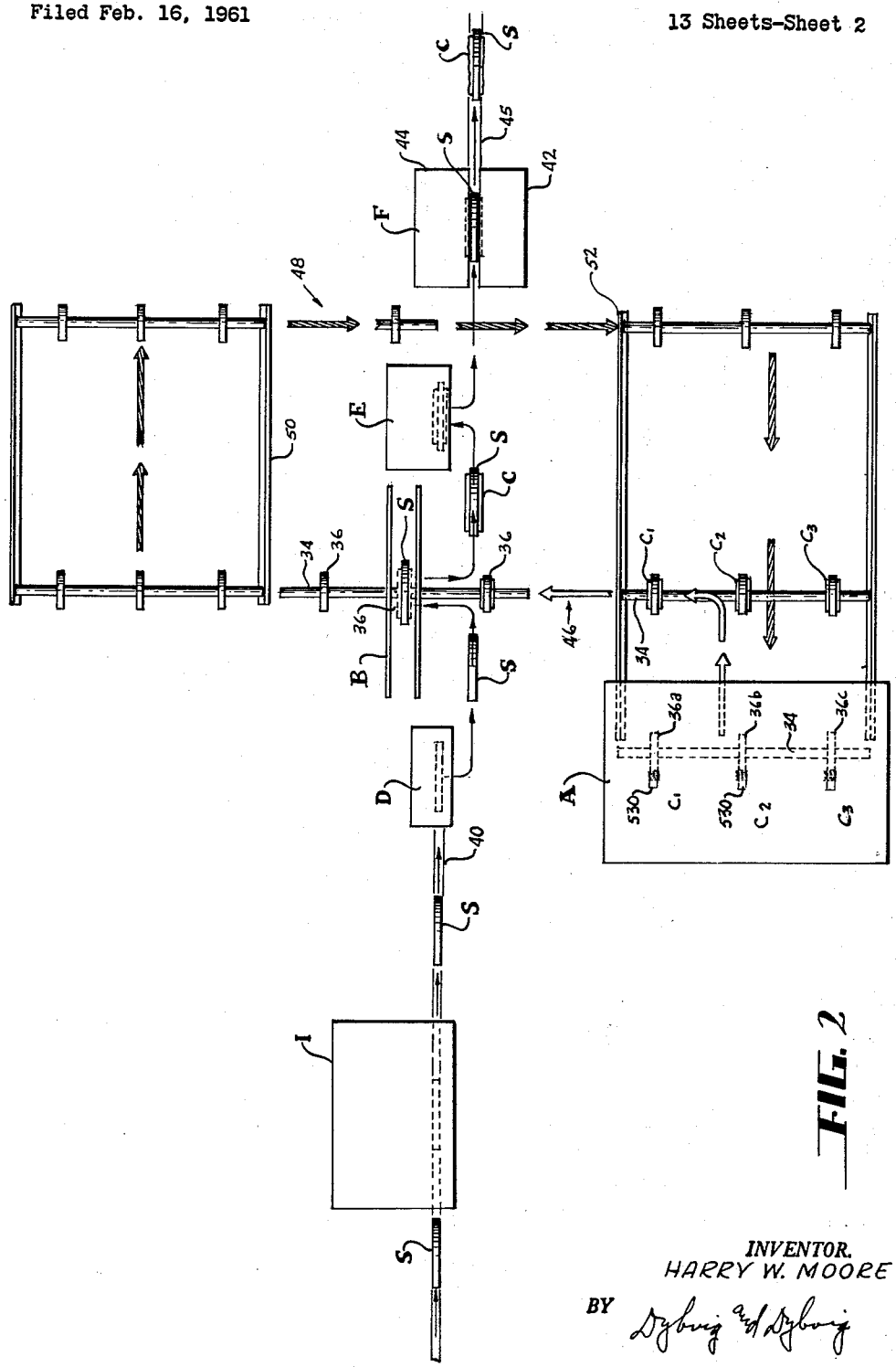
FIGURE 2 is a schematic illustration of the paths the arbors and the stator frames follow in the machine shown in FIGURE 1.

In order to load the dummy members 36 with coils, coils of wire are first wound onto coil-receiving forms such as those schematically indicated at 530 in FIGURES 2 and 28. As described in my aforementioned copending application, Serial No. 48,081, coils may be wound on each of the three coil-receiving forms 530 simultaneously by a mechanism forming part of a coil winding machine, which machine is designated A in this application. After a coil having a desired number of turns has been wound upon a frame 530, it is shoved inwardly into the slots 514 in a dummy member. As described in said application, Serial No. 48,081, the coils on the three forms designated at 530 in FIGURE 2 herein may be simultaneously transferred to corresponding coil-receiving slots 514 in the three dummy members 36a, 36b and 36c mounted on the common arbor 34. After three coils have been so transferred, one to each of the dummy members, the arbor 34 is indexed or rotated by 60° so as to present a second coil-receiving portion 512 on each of the three dummy members in position to receive a set of coils from the coil forms 530. At or about the same time, of course, three new coils are wound upon the coil-receiving forms 530. This process is continued until each of the coil-receiving portions 512 on each of the dummy members are loaded with coils. As mentioned above, the center of each portion 512 is cut out to provide a cavity 516 for a pair of blocking plates 518. Suitable tangs, not shown herein but described in application Serial No. 48,081, are mounted forwardly of each coil-receiving form 530 for engaging the blocking plates 518 and pivoting them out of a slot blocking position when the coils are transferred from the coil forms 530 to the coil-receiving slots 514 in the dummy members 36.

After coils have been loaded in each of the coil-receiving slots 514 of each of the dummy members 36 on an arbor 34, the arbor is removed from the winding machine A. The dummy members 36 are then indexed through a stator frame S, as schematically illustrated in FIGURE 27. After the first dummy member 36a is placed concentric within a stator frame, as indicated in the left portion of FIGURE 27, the C1 coils are transferred from the dummy member 36a to the coil-receiving slots 514. The specific orientation of the dummy member 36a with respect to the stator frame is shown in FIGURE 29. Each of the coils C1 are preferably transferred from the dummy member 36a to the stator slots simultaneously. This operation may be performed by a mechanism described in copending application, Serial No. 53,801, filed in the United States Patent Office, September 2, 1960, entitled "Coil Transferring Machine." This machine is not described in detail herein but is generally shown in FIGURES 1 and 2, for example, and is designated by reference character B. After the coils C1 forming the first phase of the three phase windings are inserted into the stator slots 502, the dummy member 36b is positioned concentric within the stator frame. Before the coils C2 are transferred from the dummy member 36b to the stator frame slots, the stator frame is rotated by a predetermined amount, in this case by 20°, as indicated by the centering lines 532, 532a in FIGURE 27. By so rotating the stator, the C2 coils then are positioned by 20 mechanical degrees from the C1 coils. The coils C2 are then transferred from the dummy member 36b to the stator slots. The same operations are repeated for placing the coils C3 into the stator slots. Again the stator must be rotated by 20°, as indicated by the centering lines 532a and 532b in FIGURE 27. Mechanism capable of rotating the stator frame by 20° each time a new dummy member is placed in a position concentric with the stator frame is described in my said copending application, Serial No. 53,801.

As described above, each pair of coil-receiving slots 514 are parallel to one another and parallel to the radius extending between the slot pair. The coil-receiving forms 530 in turn may have parallel sides which, when a dummy member 36 is placed in position to receive coils from a form 530, extend colinear with the internal sides of the slots 514. While the sides of the coil-receiving forms 530 may be parallel one to the other, a slight taper toward the end of the form adjacent the dummy member is desirable so that the coils may more easily be removed from the coil form. In any event, a coil C may be removed from the coil form 530 to the coil-receiving slots 514 in the dummy members with a minimum of distortion of the wires forming the coil. To transfer the coils to the stator slots, as indicated in FIGURE 29, the coil-receiving slots 514 are registered substantially centrally of pairs of the stator slots 502. When the coils are transferred from a dummy member 36 to a stator S, the coils are expanded in length but flattened or squeezed in their width. The expansion in length is not substantial and is gradual since the coil sides are cammed by the sides of the stator slots. Thus, the coils may be transferred to the stator slots with no appreciable damage.

The method described above is ideally suited for automation techniques. In the past, it has been common practice to wind coils directly into the stator slots by mechanism capable of threading wire through the slots, the mechanism and/or the stator passing through a variety of compound movements to properly layer the wire into the stator slots. Where dummy members have been used in the past, the wires have been layered directly into the dummy member slots. Again, complicated mechanisms must be used to layer the wires. Not only have the prior art mechanisms been complicated, the winding operations were not always as fast as desirable. With the method provided herein, however, fliers, not shown, may be rapidly rotated to wind coils onto the forms 530. A suitable flier mechanism for winding coils on each of the three forms 530 simultaneously is disclosed in my copending application, Serial No. 48,081. Also as described in said application, Serial No. 48,081, three coils C may be transferred to the three dummy members 36 simultaneously. Since the dummy members 36a, 36b and 36c are mounted on a common arbor 34, they may be rotated simultaneously to present empty pairs of coil-receiving slots 514 to the forms 530. As described above, a dummy member 36 loaded with coils may be placed within a stator frame and all of the coils for a single phase are removed simultaneously. Thus, there are a plurality of simultaneous operations possible. Each of the operations may be performed rapidly with comparatively simple and accordingly durable mechanisms.

The basic method described immediately above may be performed by a variety of apparatus. The remainder of this description is directed to a suitable form of apparatus embodying numerous novel features which practice the above method and continuously and automatically assemble completed stators.

APPARATUS

Referring to FIGURE 2 wherein the overall operation of a machine made in accordance with this invention is schematically illustrated, it has been found advantageous to serially pass the stator frames S along a path which is substantially transverse to the path of movement of the arbors 34. As the frames S move along their path, they are stopped at various working stations. In addition to the working station at the coil transferring machine B, the frames S are moved in the direction of the thin line arrows through an insulating machine I, an indexer D, a wedge inserting machine E and a coil former F. The details of the insulating machine I and the coil former F are immaterial and form no part of this invention. It should be noted, however, that the slots in the stator frames S are provided with insulating strips 504 by the insulating machine I. The stator frames may be introduced to the machine I and pass from the machine I along a trough 40 (FIGURE 1). There are numerous insulating machines capable of placing insulating strips into stator frame slots. For example, the machine I could be similar to that described in U.S. patent application, Serial No. 727,728, filed April 10, 1958, by John M. Biddison, which application is assigned to me. Similarly, the details of the coil former F may be conventional and form no part of this invention. Fundamentally, the coil former F comprises a pair of platens 42, 44 between which a stator frame that has been loaded with coils is placed. The platens 42, 44 are moved relatively one toward the other to press or form the coils into a desired configuration for use in an alternator. After the coils are formed by the former F, the assembled stator is released. It may then roll down a trough 45 (FIGURE 1) and into a hopper (not shown). Thus, simple troughs may be used for conveying the stator frames to the indexer D and away from the former F. The indexer D and the apparatus for conveying and positioning the stator frames between the indexer D and the former F will be discussed further under the subheading "Stator Frame Positioning."

The movements of the arbors 34 are separate from but coordinated with the movements of the stator frames S. Briefly, an arbor is indexed about its own axis to occupy a predetermined rotary position, as will be described with reference to FIGURE 3 below. After the coils C are loaded onto the dummy field members 36, the arbor 34 is moved in the direction of the open arrows in FIGURE 2 from the winding machine A to a forward path 46 and along the forward path to the coil transferring machine B. The arbors are then indexed through the machine B. The coils on each of the three dummy members 36 on each arbor 34 are transferred into a single stator frame S. The arbor 34 is then indexed beyond the machine B along the forward path to a ramp 50. The arbors 34 roll down the ramp 50 to a return path 48 in the direction indicated by the cross hatched arrows in FIGURE 2. Subsequently, the arbors move along the return path 48 to a ramp 52 down which the arbors roll back to the winding machine A. Apparatus for conveying and positioning the arbors 34 are described in detail immediately below.

ARBOR POSITIONING

Referring to FIGURES 1, 3 and 4, the winding machine A includes a pair of identical, opposed discs 30 mounted on a pair of opposed upright support panels 54 which are interconnected by a shaft 56 mounted coaxially with the discs 30. A pair of guide shelves 58 providing a continuation of a pair of rails 60 forming the ramp 52 are mounted upon the opposed support panels 54. Only one disc 30 and one shelf 58 are visible in FIGURE 3 and only one disc 30 will be described herein. When an arbor has rolled down the rails 60 onto the shelves 58, the ends of the arbor 34 fall into a pocket 62 which is formed by a sloping side 64 (FIGURE 3) of a notch 66 cut in the disc 30 and one side of an abutment 68 mounted on the other side of the notch 66. There are three pockets 62 in each disc 30. A locking pawl 70 is pivotally mounted over the pocket 62 and spring biased into engagement with the periphery of the arbor 34. A key slot 72 is provided centrally of the locking pawl 70 overlying the pocket 62. The key slot 72 is adapted to receive a key 74 projecting outwardly from one end of the arbor shaft, as shown most clearly in FIGURE 4. To insure that the key 74 is locked within the key slot 72, the arbor is provided with an indexing head 76 upon which are mounted a plurality of indexing studs or rollers 78. An arbor indexer 80 is mounted centrally of a base plate 82 to which the upright side panels 54 are attached. The arbor indexer 80 includes a bracket 84 upon which a vertically oriented ratchet pawl 86 is slidably mounted. The ratchet pawl 86 is reciprocated up and down by means of a hydraulic or pneumatic indexer actuator 88 which projects beneath the base plate. Suitable sensing means (not shown) may initiate operation of the indexer actuator 88 when an arbor falls into the pockets 62. The actuator 88 continues reciprocation until the key 74 is locked within the key slot 72. After the arbor is locked by the locking pawl 70, the ratchet pawl 86 can no longer rotate the arbor shaft and a second sensing means (not shown) stops the operation of the actuator.

After an arbor 34 is locked in position with respect to the discs 30, the discs 30 are automatically rotated or indexed to place an arbor in a winding position 34a indicated in phantom lines in FIGURE 3. The indexing of the discs 30 and other operations of the coil winding machine A are fully described in my aforementioned application, Serial No. 48,081. While the coils are being wound upon the coil-receiving slots of the dummy field member 36, the specific orientation of the arbor is under the control of the apparatus in the coil winding machine. Consequently, the arbor occupies a predetermined orientation when it reaches an output position 34b due to continued indexing of the discs 30. The arbor is then transferred to and deposited in a guide track 90 by a depositing mechanism which will now be described.

As shown in FIGURES 1 and 3, the upright support panels 54 are provided with elongate slots 92 adjacent the output position 34b of the transfer discs 30. As shown in FIGURES 1 and 6, a rotatable transverse shaft 94 is journalled in a pair of support plates or brackets 96 upon a support table 97. The plates 96 extend parallel to the side support panels 54 of the winding machine A. A pair of arbor depositing arms 98, 100 are fixedly mounted on the opposite ends of the shaft 94. The upper ends of the arms 98, 100 are provided within aligned apertures to slidably receive a pair of arbor clamping rods 102, 104. The arms 98, 100 may be pivoted about an axis extending through the shaft 94 to position the rods 102, 104 within the elgonate slots 92 by apparatus to be described later. Both rods 102, 104 may, after entering the slots 92, be moved into an arbor clamping position by means of hydraulic arbor clamp actuators 106 operating through a toggle mechanism 108 and a rotatable connection 110 at the outer ends of the rods 102, 104. The rod 102, shown to the left in FIGURE 6, is provided with an enlarged head 112 which engages within a socket (not shown) in the left side of the arbor 34. The rod 104, shown to the right, is similarly provided with a pair of prongs 114 adapted to engage cooperating sockets (not shown) in the right end of the arbor. Thus, an arbor 34 may be held in a fixed rotary position with respect to the arbor clamping rods 102, 104. The actuators 106 for the clamping rods 102, 104 are mounted by brackets 116 upon the arbor depositing arms 98, 100 whereby the actuators 106 occupy a fixed position with respect to the arms 98, 100. After the acuators 106 have been energized, whereupon the enlarged head 112 and prongs 114 engage the sockets within the ends of the arbor, the transverse shaft 94 and the depositing arms 98, 100 are rotated, as best seen in FIGURE 5, by means of a hydraulic or pnumatic depositiing actuator 118 having a piston rod 120 attached to a yoke 122 at the base of the depositing arm 98 beneath the transverse shaft 94. Thus, as the piston rod 120 moves to the left as viewed in FIGURE 5, the depositing arms 98, 100 and accordingly the arbor 34 are rotated about an axis extending through the transverse shaft 94 in the direction of the solid arrows shown in FIGURE 5. Upon continued rotation of the depositing arms 98, 100, the arbor engages and is deposited on the guide track 90. The arbor clamp actuators 106 then are energized to slide the arbor clamping rods out of engagement with the arbor. Subsequently, the depositing arms 98, 100 are rotated back to their initial position under control of the actuator 118 to pick up the next arbor positioned at 34b. For convenience, the support for the various mechanisms will be referred to as the support table 97 throughout this description. The supports may be a plurality of raised channel members, as illustrated in the drawings, or any other suitable structure.

To control the orientation of the arbors, that is to deposit an arbor 34 in predetermined orientation upon the guide track 90, a counter rotating gear mechanism 124 (FIGURES 6 and 7) is coupled with the arbor clamping rod 104. Referring to FIGURE 7, the counter rotating gear mechanism 124 includes a semi-circular counter gear 126 which is fixedly attached to the support bracket 96. An idler gear 128 is journalled to a bracket 130 mounted upon the arbor depositing arm 100. The idler gear 128 is engaged with the counter gear 126 and with a drive gear 132 that is splined to the arbor clamping rod 104. A housing 134 on the depositing arm 100 restrains the drive gear 132 from linear movement while the rod 104 is moved into and out of engagement with an arbor 34. With the gear mechanism 124, the arbor always occupies a predetermined rotary position with respect to the depositing arm 100.

A plurality of guide rods 138 are fixedly mounted upon the rotatable transverse shaft 94. The wires forming the coils on the dummy field member 36 are severed by a plurality of cutters (not shown) driven by actuators 140 (FIGURE 1) mounted on top of the coil winding machine. As the arbor 34 rotates about its axis while being transferred to the guide track 90, the severed ends of coil wires strike the guide rods 138. Accordingly, the severed ends of the wires are bent by the rods 138 into a position closely adjacent the dummy members 36.

After an arbor has been deposited on the end of the guide track 90 adjacent the winding machine A, as described above, it is moved along the guide track to the coil transferring machine B. As shown in FIGURES 1 and 5, the guide track 90 includes a base member 142 and a pair of side supports 144 having arcuate upper surfaces for engagement with the periphery of the dummy members 36. The base member 142 has a keyway 146 therein adapted to receive a key 147 (FIGURE 26) on each of the dummy members. As best shown in FIGURE 10, the guide track 90 is supported by struts 148 on the support table 97 and its forward end 90a terminates short of the transferring machine B. Since the arbor will not be supported by the guide track 90 throughout the entire distance to the machine B, the near end of the arbor (as viewed in FIGURE 1) is held downwardly by a saddle clamp 150 mounted on a pivotal saddle arm 152 as shown in FIGURE 8. Thus, the saddle clamp 150 will overcome any tendency the forward portion of the arbor has to tilt downwardly once it moves past the forward end 90a of the guide track. To urge the saddle clamp 150 against the top portion of the arbor 34, the pivotal arm 152 is angled to provide a downwardly extending portion 152a which is slidably engaged with the guide track base member 142. A roller 154 may be provided at the end of the pivotal arm opposite the saddle clamp 150, as shown in FIGURE 8, to provide rolling contact with the guide track.

The mechanism for moving an arbor 34 along the guide track 90 comprises a car 156 formed from a car block 158 to which the pivotal arm 152 is attached by means of a pin 160, as shown in FIGURE 5. The car block 158 is mounted upon a car plate 162 having two pairs of depending guide rollers 164 attached thereto which straddle an elongated guide plate 166 extending parallel but to the side and above the guide track 90. The car plate 162 in turn is attached by a link 162a to an endless chain 165 which is drivingly engaged with a pair of sprockets 167 (FIGURES 1, 5 and 8) mounted for rotation upon yokes 168 held above the support table 97 at each end of the guide track 90 by struts 170. The sprocket 167 nearest the machine B, shown in FIGURE 8, is mounted upon an axle 169 having a pinion 171 fixed thereto. The pinion 171 is drivingly engaged by a rack 172 which is attached by a support bracket 179 upon the end of a longitudinally movable piston rod 174. The movement of the piston rod 174 is limited and dampened by a damper 176 mounted on a support bracket 177 on top of a pneumatic or hydraulic actuator 178 which drives the piston rod 174. The damper 176 may be a conventional air or spring damper having a rod 176a connected to the piston rod 174 by the bracket 179.

A depending switch engaging flange 180 integrally attached to the piston rod actuates switch arms 181 at both ends of the piston rod travel. The switch arms 181 control suitable circuitry for reciprocating the piston rod 174 and, accordingly, the rack 172.

The arbor clamping arm 152 is pivoted to the car block 158 so that it may be pivoted out of the path of an arbor 34 to be deposited on the guide track 90. As shown in FIGURES 5 and 9, a cam bracket 182 having a cam surface 182a is attached to a strut 170a in the path of movement of the roller 154. Upon return of the car 156 from the transferring machine B, the roller 154 moves past engagement with the guide track 90 and engages the cam surface 182a whereupon the saddle at the forward end of the arm is raised up and out of the path of movement of the next arbor to come from the winding machine A. Of course, upon a subsequent forward stroke of the car, the roller 154 again engages the guide track 90 whereupon the saddle clamp 150 engages an arbor in the guide track. Note in FIGURE 8 that the forward portion of the arm 152 is angled to abut against the rearmost dummy field member 36c so that the arm positively engages the arbor to move it toward the transferring machine B.

When the arm 152 first pivots downwardly into engagement with an arbor 34 in the guide track, its momentum may be such as to push the back end of the arbor downwardly. If this occurred, the arbor might jump out of alignment with the guide track 90. Accordingly, the arm 152 is provided with a transversely extending flange 183 which supports a depending adjustable stop pin 184 adapted to engage the top surface of the car plate 162 when the roller 154 is engaged with the guide track. By properly adjusting the depth of the stop pin 184, the saddle clamp 150 snugly engages the arbors 34 in the guide track without the danger that the saddle clamp 150 will force the back of the arbor downwardly.

With the structure described immediately above, an arbor 34 may be moved along the forward path 46 from a position adjacent the winding machine A to a position in which the forward portion of the arbor projects within an opening in the machine B. As its projects within the opening, the forward portion of the arbor 34 is clamped within a tailstock mechanism 190 shown most clearly in FIGURES 10, 11 and 12. After the tailstock clamps the arbor, the car 156, of course, is returned to its FIGURE 1 position in preparation for the next arbor.

As shown in FIGURES 10 and 11, the tailstock 190 is supported upon a carriage 191 having opposed pairs of depending flanges 192 to which pairs of rollers 193 are mounted for rolling engagement with a horizontal support plate 194 mounted on top of a bed 195. As shown in FIGURE 11, a central groove 196 is located in the support plate 194 to provide a guide for a pin 197 projecting downwardly from the carriage 191. A hydraulic or pneumatic actuator 198 having an elongated piston rod 199 is mounted beneath the support plate 194. The piston rod 199 is connected by a bracket 200 to the carriage 191 for driving the carriage from one end of its bed 195 adjacent the machine B to the other end of the bed. The position of the tailstock 190 with respect to the machine B is controlled and sensed by a plurality of sensing switches 201a through 201i mounted on the side of the bed 195 which are engaged by a flange 202 depending from the side of the carriage 191. Initially, the tailstock 190 occupies the position indicated by full lines in FIGURES 10 and 11.

When an arbor enters the machine B, as described above, the tailstock is moved forwardly, that is to the left as viewed in FIGURE 10, to the machine B, whereupon the forward portion of the arbor is received within a socket 203 (FIGURE 12). A locating rod 204 extends axially through the tailstock socket 203. The locating rod 204 is slidable within a bearing 205 so that as the forward portion of the arbor enters the socket 203, the locating rod 204 is forced rearwardly, that is to the right as viewed in FIGURES 10, 11 and 12. The function of the locating rod 204 will be described later. When the forward portion of the arbor extends completely within the socket 203, an internal locking clamp 206 is pressed against the arbor by an actuator 207 mounted on top of the socket 203. Note that the socket 203 includes a keyway 203a for receiving the keys 74 (FIGURE 4) on the arbors 34.

After an arbor is clamped to the tailstock 190, it is moved to the right to locate the forwardmost dummy member 36a centrally of the machine B and accordingly within the stator frame S clamped therein. To accurately locate the position of the tailstock 190 with respect to machine B for indexing the dummy members 36 therethrough, three transverse stop bars 208a, 208b and 208c are mounted within the tailstock bed 195 as shown in FIGURE 11. A stop actuator 209 is mounted on a bracket 210 carried by the carriage 191. The actuator 209 is connected by a pivoted link 211 to a right angled stop member 212, one leg of which is pivoted to the link 211, the other leg being pivoted to the bracket 200. As shown in dotted lines in FIGURE 11, when the actuator 209 is energized, the right angled stop member 212 is moved downwardly to engage one of the transverse bars 208.

No attempt is made herein to describe the functions of all the various sensing switches used in this machine since persons skilled in the art may design adequate circuitry for sensing the position of parts and energizing the actuators. As examples, the switches 201b, 201d and 201f could initiate a sequence of operations in which the coils are transferred from the three dummy members 36 and the angled stop member 212 is raised to permit continued movement of the tailstock 190 to index the dummy members 36 through the machine B. The switches 201c and 201e could energize mechanism within the machine B to rotate the stator from S therein with respect to the dummy members 36, for the reasons discussed above in relation to FIGURE 27.

The sensing switch 201g is engaged to release the internal tailstock clamp 206. The sensing switch 201h may control the operation of an arbor support actuator 213 that is shown in FIGURES 10 and 11 and will be described later. Finally, the first and last sensing switches 201a and 201i may be used to control the tailstock drive actuator 198. Thus, it is seen that the movements of the tailstock 190 may be completely under the control of the various sensing switches 201. The controlled movements of the tailstock 190 are such as to sequentially place the three dummy members 36a, 36b and 36c into a position concentric with a stator frame clamped within the machine B.

Up to this point, the manner in which the car 156 moves an arbor 34 to the machine B and the manner in which the tailstock 190 indexes an arbor 34 through and beyond the machine B have been described. A stator frame transfer head 370 also engages each arbor 34 to push it through the machine B when the last dummy member 36c is located within the stator frame held in the machine B. The transfer head 370 pushes from the rear end of the arbor 34 at the same time the tailstock pulls from its forward end. The purpose and structure of the transfer head 370 and its engagement with the arbors will be discussed later.

As noted above, the sensing switch 201g may be used to release the tailstock clamp 206. It is essential that the clamp 206 be released before the tailstock 190 completes its movement to the right since the locating arm 204 abuts against a stop pin 214 mounted on a bracket 215 at the end of the tailstock bed. The left end of the locating rod 204, as viewed in FIGURE 12, has an enlarged head 204a which engages the forwardmost portion of the arbor. As the tailstock 190 reaches the end of its rightward travel, the tailstock socket 203 slips off the forward end of the arbor due to engagement of the head 204a with the arbor, whereupon the arbor 34 occupies a position shown in dotted lines in FIGURES 10 and 11. While in this position, the arbor is supported by a pair of temporary support arms 216 which are fixedly attached to a rotatable rod 217 mounted above the bed 195 by a pair of support plates 218. During most of the travel of the tailstock 190, the arms 216 extend vertically between the support plates 218, out of the path of the tailstock 190. However, as the tailstock nears the right end of the bed 195, the sensing switch 201h is tripped by the flange 202 to energize the actuator 213 which is attached by a link 219 to the rotatable rod 217, thus causing the arms 216 to pivot to a nearly horizontal position to provide a bridge in the path of the tailstock. The arms 216 extend at a slight angle to a horizontal plane, however, so that the arbor rolls onto the ramp 50, shown in FIGURES 1 and 2. The arbor subsequently rolls down the ramp 50 to the return path 48 which is located in a plane beneath the plane of the forward path 46.

Referring to FIGURES 1 and 13, an arbor 34 is carried along the return path 48 by means of a pair of trucks 220 mounted on a pair of parallel, horizontally extending endless chains 221. Since the operation of the mechanism herein is continuous, there are preferably two or more pairs of trucks 220 on the chains 221. The chains are drivingly engaged by a pair of sprocket wheels 222 located at each end of the return path 48. The sprocket wheel 222 at one end is supported by a spindle 222a which extends through a pair of support brackets 223 (see FIGURE 5). A pulley 224 affixed to the spindle 222a is driven by a V-belt 225 which in turn is driven by a motor 226. The tension in the V-belt 225 may be adjusted by a pulley 227 adjustably mounted on a support member 228 adjacent the motor 226. Similarly, the tension in the chains 221 may be controlled by an adjusting bolt 229 engaged with the axle 230 of the sprocket wheel 222 at the right end (FIGURE 13) of the return path.

As shown most clearly in FIGURE 13, one truck 220 of each pair of trucks is supported entirely above the plane of the chains 221 while the other truck has a depending flange 231 adapted to engage a switch 232 which controls the operation of the sprocket drive motor 226. Thus, the trucks 220 are temporarily halted when an arbor reaches the near end of the return path, as viewed in FIGURE 1. To prevent overtravel of the arbor, a spring biased stop 233 is mounted in an aperture in a supported bracket 234 in the path of movement of the arbor. The spring bias (not shown) is mounted internally of the stop 233.

When an arbor engages the stop 233, the stop trips a sensing switch 235 which controls a hydraulic or pneumatic actuator 236 mounted upon a yoke 237 on a portion of the machine support 97, as shown most clearly in FIGURES 5, 13 and 14. The actuator 236 drives a link 238 which is fixedly mounted centrally of a transverse rod 239, the ends of which are rotatably journalled in a pair of angled support brackets 240. A pair of links 241 are mounted on opposite ends of the transverse rod 239 and support a second transverse rod 242. Mounted at the outer ends of the second transverse rod 242 are a pair of upwardly extending arbor lifting fingers 243. Upon movement of the actuator piston in the direction of the arrow *a* shown in FIGURE 14, the fingers 243 engage an arbor 34 and roll the arbor onto the second return ramp 52. The arbor, as indicated in FIGURE 5, rolls down the return ramp 52 into the position in the winding machine A illustrated in FIGURE 3.

If an arbor were permitted to roll freely down the ramp 50 or 52, it could gather enough momentum to either do damage to the trucks 220 in the return path or the winding machine A, or the arbor could jump out of the ramps. Accordingly, a brake or stop means must be provided for the ramps 50 and 52. In FIGURES 3, 5 and 15, a brake 250 for the ramp 52 has been shown. A similar brake or stop mechanism is provided for the ramp 50.

The pair of parallel, sloping rails 60 forming the ramp 52 are supported on struts 252 on the support table 97. An upwardly extending flange 253 is mounted on the outer edge of each of the rails 60 so that an arbor 34, when rolling down the upper surfaces of the rails, 60, is confined therebetween. The ramp 50 is similarly constructed. As shown in FIGURES 3 and 15, the brake or stop means 250 includes a pair of stop members 254, one adjacent each rail projecting into the path of an arbor 34 rolling along the rails 60. Only one member 254 is shown herein. Each stop member 254 is connected by a pivot pin 255 to its adjacent rail 60 while the two stop members 254 are interconnected by a channel member 256. A stop or brake actuator 257 is pivotally supported by a yoke 258 mounted on the support table 97. The actuator 257 includes a piston rod 260 pivotally connected to a yoke 261 attached to the channel 256 centrally between the stop members 254. A trip lever 262 is pivotally mounted as by a pivot pin 263 to one of the rails 251 slightly above or to the right, as viewed in FIGURE 5, of the stop members 254. A switch actuator 264 is fixedly mounted upon the pivot pin 263 so as normally to lie adjacent a switch arm 265 which is connected by circuit means (not shown) to the stop or brake actuator 257. The trip lever 262 includes a portion 262a which normally extends in the path of an arbor and which is held in that position due to the counterbalancing effect of an angled portion 262b thereof projecting on the other side of the pivot pin 263. As an arbor rolls down the rails, the trip lever 262 is engaged and rotated in a counterclockwise direction, as indicated by the arrow *a* in FIGURE 5, whereupon the switch actuator 264 strikes the switch arm 265 to energize the brake actuator 257. The brake actuator piston 260 moves slowly in the direction of the arrow *b* in FIGURE 15 and causes the stop members 254 to be pivoted about the pin 255. Since the piston 260 moves slowly, an arbor 34 rolling along the rails 251 will be temporarily stopped by the stop members 254 before they are pivoted out of the arbor path. After the stop members 254 have been pivoted out of position, the arbor rolling along the rails is free to continue until it is clamped to the discs 30 in the winding machine A as described above.

In review, with the arbor positioning mechanism described above, an arbor 34 may be first accurately aligned within the winding mechanism A by means of the arbor indexing mechanism 80 whereupon the coil-receiving slots 514 in the dummy members 36 on the arbor 34 are properly positioned to receive coils from the winding machine A. Subsequently, the arbor 34 may be removed from the winding machine and deposited in the guide track 90. The arbor 34 is then moved along the forward path 46 on the guide track 90 by means of the car 156 and inserted into a stator frame S clamped within the transferring machine B. At this point the tailstock mechanism 190 clamps the arbor and indexes it through the machine B. Of course, the dummy members 36 must be accurately aligned with the stator frame at the machine B. Accurate alignment is assured since the position of the arbor 34, when it is deposited upon the guide track 90 is predetermined by the gear mechanism 124 in the arbor depositing arm 100. The predetermined position of the arbor is retained along the guide track 90 due to the engagement of the keys 147 on the dummy members 36 with the guide slot 146 in the base 142 of the guide track. As will be described later, the orientation of the stator frames S within the machine B is also accurately predetermined.

After the arbor 34 has been indexed through the coil transferring machine B, the lifting arms 216 adjacent the tailstock bed 195 roll the arbor onto the ramp 50. The arbor is then returned to the winding machine A along the return path 48 by means of the trucks 220 and down the ramp 52 and back to the indexing apparatus 80. Note that the plane of the forward path 46 is above the plane of the return path 48 and that the arbor indexer 80 is below the plane of the return path. Accordingly, it is possible to provide two downwardly sloping ramps 50, 52 between the forward path 46 and the arbor indexer 80. Note also that no manual manipulation of the arbor is required and that only a few arbors 34 are necessary to provide a continuous supply of coils to the coil transferring machine B. In operation, one arbor 34 could be located within the winding machine A while a second arbor 34 is located within the machine B and a third arbor 34 travels along the return path. Thus, with three arbors 34, continuous operation is possible. Of course, there could be more or less arbors depending upon the speed of operation of the various mechanisms.

STATOR FRAME POSITIONING

As noted before, the simple troughs 40, 45 may be used for conveying the stator frames S to the indexer D and from the former F away from the machine. The indexer D, however, places each stator frame in a predetermined position for insertion into the machine B. A predetermined orientation of the stator frames S within the machine B is required since the slots 502 in each stator frame must be accurately aligned with the coil-receiving slots 514 in the dummy members 36. Also, the slots in the stator frames must be accurately aligned with a plurality of slots in the wedge inserting machine E as will be described below. Accordingly, a more complex mechanism is required for conveying and positioning the stator frames S between the indexer D and the wedge inserting machine E. For this purpose, a plurality of transfer heads 303, 370 and 420 (FIGURE 16) mounted on pivoted arms are used. The indexer D and the transfer heads will now be described in detail.

Referring to FIGURES 17 and 18, the indexer D is shown as including a vertically extending support plate 300 mounted adjacent the end of the trough 40 by braces 300a on a base plate 300b. A cradle block 301 having an internal arcuate surface 301a and a base block 302 mounted on the base of the support plate 300 supports a stator frame S that has rolled down the trough 40. By means of the indexer D, it is desired to orient the stator frame S in a predetermined position for pick-up by the first transfer head 303, as will be described later. To achieve a predetermined orientation, the stator frame S is provided with a plurality of circumferentially spaced transverse pins 304 adjacent its periphery. An indexing arm 305 having a ratchet pawl 306 pinned on one side thereof, is pivotal upon a pin 307 projecting rearwardly of the support plate 300 about an axis extending axially through the frame S. As shown best in FIGURE 18, the indexing arm 305 is bent so as to extend through an aperture 308 located generally centrally of the support plate 300. The outer end of the indexing arm 305 is pivotally attached to a movable plunger 309 forming part of a hydraulic or pneumatic actuator 310 which in turn is pivotally mounted upon the support plate 300 by means of a bolt 311. As is apparent, the stator frame S located within the cradle formed by the cradle block 301 and the base block 302 may be rotated or indexed upon reciprocation of the actuator plunger 309 from the full line position indicated in FIGURE 17 to that shown in dotted lines due to engagement of the ratchet pawl 306 with the pins 304 on the stator frame.

The orientation of the stator frame is sensed by means of a sensing pin 312 which projects longitudinally through the aperture 308. The pin 312 is fixedly mounted within a collar 313 slidably mounted upon a biasing rod 314. In turn, the rod 314 is pivotally mounted by means of a sleeve and pivot pin arrangement 315 to the indexing arm 305, as shown best in FIGURE 18. Then sensing pin 312 is attached on the other side of the support plate 300 to a switch arm 316 that is pivotally mounted upon a bracket 317 attached to the support plate 300. The switch arm 316 is biased to lie in a horizontal plane with the actuator 310 in its uppermost or full line position shown in FIGURE 17 due to the leverage obtained by the relatively heavy enlarged arm portion 316a to the left of its pivotal connection to the bracket 317. A coil spring 318 is loosely mounted upon the biasing rod 314 between the sleeve 313 and the head 319 of the rod, which may be a pair of interlocking nuts.

As the actuator plunger 309 moves to its lowermost or phantom line position shown in FIGURE 17, the biasing rod 314 moves downwardly. Upon downward movement of the biasing rod 314, a stop collar 320 mounted on top of the coil spring 318 is engaged by the head 319 of the biasing pin 314 whereupon the spring 318 exerts pressure on the sleeve 313. Hence the sensing pin 312 is lowered into engagement with the periphery of the stator frame. A small aligning notch 321 is cut longitudinally in the periphery of the stator frame. As the stator frame is indexed by the pawl 306, the notch 321 approaches the position shown in FIGURE 17 wherein the sensing pin 312 extends therein. When this occurs, the outer, enlarged, end 316a of the sensing switch arm 316 engages a switch 322 which cuts off the source of power to the actuator 310. Once the switch 322 is engaged, the plunger 309 and the switch arm 316 remain in the phantom line position shown in FIGURE 17 until the stator frame is removed by the transfer head 303.

The operation of the indexer may be initiated by means of a plunger 323 which extends through the base block 302 and which contacts a switch arm 324 located beneath the base block 302. Continued reciprocation of the actuator plunger 309 is obtained by the engagement of an angled flange 325 mounted upon the end of the plunger 309 with a pair of sensing switches 326 mounted upon the brace 300a. While being indexed, the stator frame S is spaced from the support plate by a flange 328 attached to the support plate. To prevent the frame S from falling away from the indexer, a pivotally mounted clamping plate 329 extends in front of the upper portion of the stator frame. The weight of the stator frames rolling down the trough 49, of course, is sufficient to prevent the stator frame from moving back up the trough.

After the desired orientation of a stator frame S has been achieved, it is transferred from the indexer D to the coil transferring machine B by means of the first transfer head 303. Referring to FIGURES 19, 20 and 20a, the transfer head 303 includes a hydraulically or pneumatically driven internal clamp head 340 mounted upon a piston rod 341 driven by a transfer cylinder 342. The cylinder 342 is mounted upon an arm 343, as shown in FIGURES 1 and 16, which is fixed attached to a collar 344 journalled in a bifurcated bracket 345 on the support table 97. As shown in FIGURE 16, a depending actuating arm 346 is attached to the underside of the collar 344. The base of the actuating arm 346 is attached to a piston rod 347 that is movable along a horizontal path by an actuator 348, which may be seen in FIGURE 10. As is apparent from FIGURE 16, the actuating arm 346 may be rotated from the full line position wherein the transfer head 303 lies coaxially with the center of the machine B along the path S1 to a position wherein the transfer head 303 extends coaxially with a stator frame S supported in the indexer cradle.

Referring again to FIGURE 20, the internal clamp head 340 includes a cylinder block 350 having a pair of diametrically opposed cylinder cavities 351 defined by sleeves 350a. The internal clamp head 340 also includes a hub-shaped member 352 which is pinned to the outer end of a piston rod 353 driven by the cylinder 342 and an outer plate 354 which is attached to the hub-shaped member 352 by a pair of threaded bolts or screws 355 extending transversely through the cylinder block 350 and through a transverse aperture 356 in each of a pair of clamping plungers 357 which are slidably mounted within the cylinder cavities 351. The movements of the piston rod 353 are guided by a rod 353a mounted on the cylinder frame. The plungers 357 are moved radially outwardly by a pair of opposed pistons 358 mounted in the opposed cylinders 351. Fluid under pressure is introduced to the cylinders 351 through fluid communication lines 359 cut in the center of the cylinder. Of course, fluid under pressure is supplied to the lines 359 through suitable fluid ports (not shown). The outer face of each piston 358 abuts the inner face of its adjacent plunger 357. The plungers 357 are bored out to receive springs 360 which abut against the bolts or screws 355. When fluid under pressure enters the cylinders 351, the pistons 358 are forced outwardly against the bias of the springs 360 whereupon the outer surfaces of the plungers 357 engage diametrically opposed inner peripheral portions of the stator frame S. The radial movement of the plungers is limited by the width of the apertures 356.

In operation, after the desired orientation of a stator frame S is obtained by the indexer D, the transfer cylinder 342 drives the piston rod 353 forwardly toward the indexer D whereupon the clamp head 340 enters the central aperture of the stator frame. Fluid under pressure is then introduced into the opposed cylinders 351 whereupon the plungers 357 tightly engage diametrically opposed internal portions of the stator frame S. The piston rod 353 is then returned rearwardly or to the left as viewed in FIGURE 20. The actuator arm 346 is then rotated from the dotted line position shown in FIGURE 16 to that shown in full lines causing the clamp head 340 with the stator frame clamped thereto to be positioned in front of the coil transferring machine B. The longitudinally extending piston rod 353 again is moved forwardly whereupon the stator frame is engaged within a support ring (not shown) mounted internally of the coil transferring machine B. At this time, a plurality of hydraulically actuated clamps 361 (FIGURE 16) clamp the stator frame to the support ring. The operation of the clamps is more fully described in my aforementioned copending application, Serial No. 53,801. Once the stator frame S is clamped to the support ring in the machine B, the actuator arm 346 is driven back to the dotted line position, shown in FIGURE 16, whereupon the transferring head 303 is in position to pick up the next stator frame from the indexer S.

With a stator frame S clamped within the coil transferring machine B, an arbor carrying the dummy field members 36 may now be moved along the guide track 90 and into position within the coil transferring machine, as already described above. Also, as described above, the tailstock mechanism 190, shown in FIGURES 10, 11 and 12, indexes the dummy field members 36 through the stator frame S until the coils have been removed from the rearmost or third dummy field member 36c. As further described in the aforementioned application, Serial No. 53,801, it is contemplated that at this time the stator frame has been completely loaded with coils. Some of the coils within the stator slots could unravel and thus fall out. If this should happen, the stator assembly would, of course, be rejected as unusable. To reduce the number of rejected stator assemblies, the precaution is taken that the internal aperture of the stator frame is constantly filled; that is, the internal surface of the stator frame is engaged either by the third dummy member 36c or by the second transfer head 370, until the coil retaining wedges 506 inserted by the machine E are placed in the stator slots. The structure of the second transfer head 370 will now be described.

The second transfer head 370 is mounted for movement from the transferring machine B along the path S2 to the wedge inserting apparatus E in a manner similar to the first transfer head 303 as shown in FIGURE 16. Thus, an actuator 371 located beneath the table 97 is drivingly engaged with the base of an actuating arm 372 which is fixedly attached to a rotatable shaft 373 journalled in a bifurcated bracket 374 extending in the opposite direction from the bracket 345 which supports the first transfer arm 343. A transfer arm 375 supported on top of the rotatable shaft 373 in turn supports the transfer head 370.

Referring now to FIGURE 22, the transfer head 370 includes a frame 380 providing a primary cylinder 381 which drives a longitudinal piston rod 382 upon which a clamp head 383 is mounted. When the primary cylinder 381 lies coaxially with the center of the coil transferring machine B, as shown in FIGURE 1, the longitudinal piston rod 382 projects outwardly from the cylinder 381 into the position shown in FIGURE 22. The outer end of the piston rod 382 is enlarged to provide a relatively large plate 384 against which a cylindrical cylinder block 385 forming the clamp head 383 abuts. The cylinder block 385 supports a pair of diametrically opposed pistons 386 mounted for limited radial movement therein, the movement of the pistons 386 being limited by a threaded bolt or screw 387 extending through an aperture 388 therein, as was the case with the plungers 357 in the first clamp head 340. Only one piston 386 is shown in FIGURE 22; the other is visible in FIGURE 23. The cylinder block 385 and the forwardmost end portion of the piston rod are bored out to provide a hollow socket 389 which is adapted to receive the trailing end of an arbor 34 positioned within the machine B.

As shown in FIGURE 24, the front surface or face of the clamp head 383 is provided with a plurality of grooves 390 which are adapted to receive the spacer bars 524 on the rear face of the third or rearmost dummy member 36c positioned within the machine B. While the transferring machine B is transferring the coils from the dummy member 36c to the stator slots, the transfer arm 375 is pivoted to place the transfer head 370 into the position shown in FIGURE 1 wherein it extends coaxially with the stator frame S clamped within the machine B. Suitable hydraulic or pneumatic supply means, not shown, energizes the primary cylinder 381 to move the piston rod 382 forwardly whereupon the end of the arbor shaft is received within the hollow socket 389. Ultimately the front surface of the clamp head 383 engages and mates with the rear surface of the third dummy member 36c. In this manner, the piston rod 382 exerts pressure against the rear of the arbor 34. As soon as the stop member 212 is released from the last transverse stop bar 208c, as described above with reference to FIGURE 11, the tailstock 190 and the piston rod 382 cooperate to push the arbor 34 along the forward path 46 out of the machine B. The pushing force exerted by the piston rod 382 is greater than the pull provided by the tailstock 190. Therefore, the front surface of the clamp head 383 remains in abutting relationship with the rear surface of the last dummy member 36c until the clamp head 383 reaches its extreme forward position. When this occurs, the stator frame S is located centrally with respect to the clamp head 383 in the position indicated by dotted lines S in FIGURE 22. Fluid is introduced into a suitable passageway, not shown, within the cylinder block 385 to force the diametrically opposed clamping plungers 386 radially outwardly. Thus, a firm grip on the internal face of the stator frame S is obtained.

With the structure thus far described with reference to the second transfer head 370 and the third dummy member 36c the stator frame aperture is constantly filled so that the coils C mounted within the stator frame slots have no opportunity to unravel and become loose. Since the clamp head 383 must move a considerable distance forwardly of the primary cylinder 381, a guide rod 391 is mounted in a pair of bushings 392 supported by the frame 380 and is affixed to the clamp head 383 by means of a lock washer 393 which in turn is clamped between the cylinder block 385 and the enlarged plate portion 384 of the piston rod 382. Note that the end of the guide rod 391 within the cylinder head 385 may have a pair of grooves 394, one of which provides a fluid passageway within the cylinder head while the other encloses an oil seal.

After a stator frame S has been clamped to the clamp head 383, as described immediately above, the piston rod 382 is withdrawn; that is, it is moved to the left as viewed in FIGURE 22. Simultaneously, the plurality of clamps 361 within the coil transferring machine B are released whereupon the stator frame is pulled outwardly out of engagement with the winding machine B. The actuator arm 372 is then pivoted from the position shown in phantom lines in FIGURE 16 to its full line position whereupon the stator frame S is transferred, along the dotted line path S2 shown in FIGURE 16, from the coil transferring machine B to the wedge inserting machine E.

The wedge inserting machine E forms the subject matter of my copending application, Serial No. 62,590, filed October 14, 1960, entitled "Wedge Inserting Machine." Accordingly, no detailed description of this machine is included herein. For the moment, it should be noted that strips of wedge material 395 which are wound upon a pair of supply reels 396 (see FIGURES 1 and 10) are fed to the wedge inserting apparatus E which cuts the strips of wedge material into the small wedges 506. Once the wedges 506 are placed within the stator slots 502, the coils C are retained therein. In addition to cutting the strips of wedge material 395 into small wedges, the inserting machine E places the cut wedges 506 into a cartridge 397 (FIGURE 10). Subsequently, the wedges are pushed from the cartridge 397 into the stator slots 502. In order for the last mentioned operation to take place, the stator frame must be tightly clamped against the cartridge 397 upon a cylindrical support head 398. The position the stator frame must occupy is indicated by phantom lines S in FIGURE 10.

During operation of the wedge inserting machine, the cartridge 397 and the stator frame S rotate with respect to the support head 398. While the coils C are firmly retained within the stator slots after the wedges 506 are inserted therein, the stator frame must be transferred to the support head 398 in much the same manner as the stator frame was removed from the machine B. In other words, a support for the entire internal face of the stator frame must be provided at all times before the wedges 506 are inserted into the stator slots 502.

The transfer and clamping of the stator frame upon the support head 398 of the wedge inserting machine E are accomplished as follows: Surrounding the primary cylinder 381 of the second transfer head 370 is a stripper plate 400 shown best in FIGURES 22 and 23. Normally, the stripper plate 400 lies in abutment with a fixed disc 401 attached to the frame 380. A pair of secondary actuators or cylinders 402 having piston rods 403 fixedly secured to the transfer disc by means of lock screws 404 are mounted upon the frame 380. Three rollers 405 are mounted in circumferentially spaced relationship by brackets 406 upon the forward face of the stripper plate 400.

The operation of the second transfer head 370 in moving a stator frame S from the machine B to the wedge inserting machine E is as follows. After the stator frame is clamped into the position indicated by dotted lines in FIGURE 22, the longitudinal piston rod 382 is withdrawn to the extreme left or innermost position as viewed in FIGURES 22 and 23. The enlarged portion 384 of the piston rod lies within a central aperture 407 within the stripper plate 400. The entire transfer head 370 is pivoted to a position, indicated in full lines in FIGURE 16, wherein the cylindrical clamp head 383 and the cylindrical support head 398 on the wedge inserting machine E extend coaxially. The piston rod 382 is then moved slightly forwardly, that is to the right in FIGURE 22, whereupon the front face of the clamp head 383 abuts against the outer face of the support head 398, as indicated by phantom lines in FIGURE 10. The secondary actuators 402 are then energized whereupon the rollers 405 on the face of the stripper plate 400 engages the rear face of the stator frame S, thereby pushing the stator frame off the clamp head 383 onto the contiguous support head 398. The stripper plate 400 remains in this position throughout the operation of the wedge inserting machine E to clamp the stator frame S against the wedge cartridge 397. Since the only portions of the transfer head 370 that engage the stator frame at this point are the rollers 405 mounted on the front face of the stripper plate 400, the stator frame may rotate with the wedge cartridge 397 about the support head 398. During rotation, a wire former 408 (FIGURE 24) pinned to the plate 400 forms the free severed ends of the wires forming the coils about the periphery of the stator frame.

To avoid unwanted movement of the stripper plate 400 while it is engaged with the stator frame S, three circumferentially spaced guide rods 409 extend through aligned apertures in the stripper plate 400 and the adjacent fixed disc 401. To reduce the drag on the plate 400 and to provide a large area of contact with a fixed member, the guide rods 409 also pass through enlarged ball bushings 410 mounted upon the rear face of the fixed disc 401.

As described above, a stator frame S may be stripped from the clamp head 383 onto the support head 398 while the respective heads 383, 398 abut one against the other. Thus, after the coils from the third dummy member 36c have been transferred to the stator slots 502, the internal face of the stator frame is constantly engaged by the third dummy member 36c, the second transfer clamp head 383 or the wedge inserting machine support head 398. The coils C within the stator slots accordingly have no opportunity to unravel or fall out of the stator slots.

The wedge cartridge 397 includes a plurality of wedge-receiving apertures (not shown) equally spaced about the periphery of the support head 398. The stator slots must be accurately aligned with the wedge-receiving apertures when the stator is transferred to the support head 398. Accordingly, a plurality of slots 397a are cut in the front edge periphery of the cartridge 397, which slots receive the pins 304 in the stator frame. Further, a stator aligning rod 410 is movably mounted on the frame 380 of the second transfer head 370. The aligning rod 410 extends longitudinally through the disc 401 and stripper plate 400 as best shown in FIGURE 23. A spring 412 encircles the forward portion of the rod 410 between the plate 400 and a washer 414 pinned forwardly on the rod. A second rod 411 attached to the washer guides the washer and thus prevents unwanted movement of the rod 410. The rod 410 is thus spring biased to follow the movements of the stripper plate 400, but it may move to the left, as viewed in FIGURE 23, when a stator frame is being moved along the path S2 to the inserter. The rod is adapted to enter the longitudinal aligning notch 321 located in the outer periphery of the stator frame. When a stator frame S is first clamped by the second clamp head 383, there is no danger that the stator frame will be out of the predetermined alignment provided by the indexer D since the clamps within the machine B are not released until the second clamp head 383 firmly engages the stator frame. However, the clamping plungers 386 in the clamp head 383 are necessarily released from engagement with the stator frame as the stripper plate 400 moves the stator frames onto the support head 398. At this time, however, the engagement between the aligning rod 410 and the aligning notch 321 in the stator frame retains the predetermined rotary orientation of the stator frame. To prevent the rod 410 from interfering with the rotation of a stator frame mounted on the head 398, a stop 416 mounted rearwardly on the rod abuts a stop member 418 on the frame 380 before the plate 400 completes its forward travel (to the right, as viewed in FIGURE 23). The rod 410 accordingly, is disengaged from the stator frame. By the time the rod is disengaged, however, the stator frame is held in alignment by the slot 397a in the cartridge 397. Thus, the orientation of the stator frames is controlled throughout their movement between the various working stations D, B and E.

After each of the slots 502 in a stator frame have been provide dwith coil retaining wedges 506, the stripper plate 400 is removed from engagement with the stator frame by a return stroke of the piston rods 403. Subsequently, the second transfer head 370 is pivoted downwardly or to the left as viewed in FIGURE 16, to pick up the next stator frame S from the machine B. The third transfer head 420 then picks up the completed stator assembly from the support head 398 on the wedge inserting machine E and transfers the completed stator assembly from the wedge inserting machine E along the path S3 to a clamp member 431 (FIGURE 1) mounted adjacent the coil former F. The third transfer head 420, rather than having an internal clamp, has a pair of external clamps 422 which engage the outer periphery of the stator frame. Since hydraulically actuated external clamp members are well known, it is believed unnecessary to encumber this specification with a detailed description of the external clamps 422. The longitudinal extending cylinder 423 for the third transfer head 420, as in the case of the first and second transfer heads 303, 370, is pivoted upon a transfer arm 424. In this case, however, the transfer arm 424 is attached to a sleeve 425 rotatably journalled at one end of a pair of stationary suports 426. The other ends of the supports 426 are connected to the bifurcated bracket 374 to which the second transfer arm 375 is mounted.

The actuator arm 427 for the third transfer arm 424 is connected at its upper end to the base of the sleeve 425 and at its lower end to a link 428 which is attached to the same piston rod to which the actuator arm 372 for the second transfer head 370 is pivotally attached. Thus, as shown in FIGURES 1 and 16, the single actuator 371 controls the movement of both the second and third transfer heads 370, 420 through the parallelogram linkage arrangement formed by members 372, 426, 427 and 428. The dead center point for the parallelogram linkage arrangement is provided by a pair of vertically extending struts 429 to which the stationary support members 426 are mounted. The lower link 428 of the parallelogram may be adjusted by means of a screw and nut arrangement 430 shown in FIGURES 1 and 16.

The third transfer head 420 deposits the stator frame, which has now been provided with coils C and coil retaining wedges 506, into the clamp mechanism 421. The clamp mechanism 421 includes a pair of jaws 432, 433, the separation of which is determined by an actuator 434 mounted upon the uppermost jaw 432 and connected to the lowermost jaw 433. The uppermost jaw 432 is pivotally mounted at its upper end to a support bracket 435 and may be pivoted by an actuator 436 along with the lowermost jaw 433 from the position shown in FIG- URE 1 to a position in which a stator S is placed between the platens 42, 44 in the coil former.

As noted before, the construction of the coil former F may be conventional and accordingly is not described herein. Also as noted before, after a stator is formed by the former F, it rolls down the trough 45 away from the machine.

Thus, mechanism has been shown capable of automatically and continuously assembling completed stators following the process described earlier. No manual manipulation of the stator frame or the coils is required. Since the process is continuous and utilizes several simultaneous operations for winding and transferring the coils for all three phases, the speed with which stators may be produced is increased over machines used in the past.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of winding a polyphase stator having inwardly directed pairs of slots, said method including the steps of winding the coils for each phase in seriatim, transferring each of the coils after being wound into fixed spaced relation with respect to the other coils of the same phase and with respect to the coils of the other phases, transferring the wound coils arranged in fixed spaced relation with one phase registering with the slots in the stator for said one phase, transferring the coils of said one phase to the stator slots, then moving the coils of a second phase into registry with the slots in the stator for said second phase, transferring the coils of said second phase to the stator slots and repeating the operations until all the phases have been transferred to the stator.

2. In a method of mounting coils on a stator frame having pairs of slots for coils, the steps of winding a plurality of coils consecutively from the same strand of wire upon a coil form, transferring each of the coils from the form to a dummy field member having a plurality of circumferentially spaced pairs of coil-receiving slots, there being a separate pair of slots for each coil, aligning the coil-receiving slots in the dummy field member with pairs of slots in the stator frame and transferring the coils from the dummy field member to the aligned slots in the stator frame.

3. In a method of mounting coils on a stator frame used in a polyphase alternator having pairs of slots for coils, the steps of simultaneously winding a coil on each of a plurality of coil forms, there being as many forms as phases desired for the stator, transferring simultaneously the coils from the forms to a pair of coil-receiving slots in each of a series of aligned dummy members, there being one dummy member for each phase, each dummy member having a plurality of pairs of coil-receiving slots, one pair for each of the coils in a phase, winding a second coil on each of the coil forms, transferring the second coil from each of the forms to a second pair of slots in each dummy member, repeating said winding and transferring steps above until each of said dummy members is provided with the desired number of coils for each phase, aligning the pairs of coil-receiving slots in one of said dummy members with pairs of slots in the stator frame, transferring simultaneously all of the coils from said one dummy member to the aligned slots in the stator frame whereby the stator frame is provided with coils for one phase, and subsequently consecutively aligning the remaining dummy members with other pairs of slots in the stator frame and transferring the coils simultaneously from each of the remaining dummy members to the other stator slots to provide the stator frame with coils for the other phases.

4. The method of winding a polyphase stator having inwardly directed pairs of slots, said method including the steps of loading a plurality of coils wound from the same strand of wire and forming the windings for one phase of said stator into a dummy field member having a plurality of circumferentially spaced pairs of coil-receiving slots, aligning the coil-receiving slots of the dummy field member which are loaded with coils with pairs of slots in the stator frame, and transferring the coils forming said one phase from the dummy field member to the aligned slots in the stator frame.

5. In apparatus for continuously and automatically providing stator frames with coils, wherein at least one dummy field member mounted on an arbor is loaded with coils by a winding machine, the coils subsequently being transferred from the dummy field member to a stator frame by a coil transferring machine, the combination comprising: first means for moving the arbor in a first path from the winding machine to the transferring machine, second means for moving the arbor along the first path beyond the transferring machine, means providing a return path spaced from said first path, a first ramp located between said first path and return path for transferring the arbor to the return path, and a second ramp for transferring the arbor from the return path to a position adjacent the coil winding machine.

6. In apparatus for conveying an arbor having a plurality of coil-receiving dummy field members, the combination comprising: a ramp including a pair of parallel rails inclined with respect to a horizontal plane, means for loading an arbor onto the higher end of said ramp, whereby said arbor rolls along the ramp toward the lower end thereof, stop means located between said rails in the path of movement of the arbor, and means for moving said stop means away from the path of movement of the arbor, said last mentioned means being tripped by the arbor as it approaches the stop means, whereby said stop means only momentarily stops the movement of the arbor along the rails.

7. The combination defined in claim 6 in which the means for moving the stop means out of the path of the arbor includes a tripping lever pivotally mounted in the path of the arbor, means pivotally connecting the tripping lever to one of said rails, a switch, actuator means connected to said tripping lever for actuating said switch upon movement of the tripping lever as the arbor engages the tripping lever, and a stop actuator energized by said switch connected to said stop means.

8. In apparatus for conveying an arbor having a plurality of coil-receiving dummy field members mounted thereon, the combination comprising: an elongated guide track, means for depositing the arbor on one end of said guide track, and means for moving said arbor from said one end of the guide track along said guide track to a position in which a portion of said arbor projects beyond the other end of said guide track, said last mentioned means including a guide plate mounted adjacent and parallel to the path of movement of the arbor, a car slidably mounted on said guide plate, means for moving said car along the length of said guide plate and an arbor engaging arm pivotally attached to said car, one end of said arm having a saddle portion adapted to engage said arbor behind a dummy member mounted thereon, the other end of said arm being adapted to slidably engage said track whereupon said saddle is held in clamping engagement with the arbor.

9. The combination of claim 8 in which the means for moving the car along the guide plate includes a pair of sprockets, an endless chain drivingly engaged with said sprockets, means connecting said chain with said car and means for driving one of said sprockets including a pinion connected to said one sprocket, a rack drivingly engaged with said pinion, and means actuating said rack in one direction to move the car from one end of said guide plate to the other end of said guide plate, said means further actuating said rack in a reverse direction to return the car to said one end of said guide plate.

10. The combination of claim 8 in which means are provided adjacent said one end of said guide track engaging the slidable end of said arm to hold the saddle on said arm in a raised position while an arbor is being deposited on the track.

11. In an apparatus for automatically winding stators wherein an arbor provided with at least one dummy field member having coil-receiving slots is transferred from a coil winding machine which deposits coils in the col-receving slots of the dummy member and is subsequently transferred to a coil transferring machine which transfers the coils from the dummy slots to slots in a stator frame, means for moving the arbor from the coil winding machine to a guide track leading to the coil transferring machine, comprising: a pair of vertically extending pivotally supported depositing arms, a pair of arbor engaging arms one slidably mounted in each of said depositing arms, means pivoting said arms to a first position wherein said arbor engaging rods extend colinearly with an arbor in said coil winding machine to a second position wherein said arbor is deposited in said guide track, means moving said arbor engaging rods into engagement with the ends of said arbor at said first position, whereupon said arbor is clamped by said arbor engaging arms, and means controlling the rotary position of the arbor, whereupon said arbor is deposited on said guide track in a predetermined rotary orientation.

12. The combination of claim 11 wherein said means controlling the rotary position of the arbor comprises gear means connected to one of said arbor engaging rods.

13. An apparatus for automatically winding stators in which an arbor provided with at least one dummy member having coil-receiving slots therein in supported within a stator frame mounted upon a coil transferring machine which transfers coils from the coil-receiving slots in the dummy field member to the coil-receiving slots in the stator frame, means for conveying the arbor to and beyond the coil transferring machine comprising: a guide track for supporting the arbor, a car releasably engaged with one end of the arbor, means driving said car to move the other end of the arbor into an aperture within the coil transferring machine, a tail-stock adapted to clamp said other end of the arbor as it passes through said aperture, and means driving said tail-stock to pull the arbor through the transferring machine.

14. In apparatus for automatically winding stators in which an arbor provided with a plurality of adjacent dummy field members having coil-receiving slots therein is indexed through a stator frame mounted upon a coil transferring machine which transfers coils from the coil-receiving slots in the dummy field members to the coil-receiving slots in the stator frame, means for conveying the arbor to and beyond the coil transferring machine comprising: a guide track for supporting the arbor, a car releasably engaged with one end of the arbor, means driving said car to move the other end of the arbor into an aperture within the coil transferring machine, a tailstock adapted to clamp said other end of the arbor as it passes through said aperture, means driving said tailstock to index the arbor through the transferring machine, and means intermittently stopping the movement of the tailstock when a dummy field member is located within the stator frame.

15. In apparatus for continuously and automatically providing stator frames with coils, wherein at least one dummy field member mounted on an arbor is loaded with coils by a winding machine, the coils subsequently being transferred from the dummy field member to a stator frame by a coil transferring machine, the combination comprising: a guide track positioned in a first path, depositing means for moving an arbor from the winding machine to the guide track, a car movable along a path parallel to the guide track releasably engageable with one end of the arbor on the guide track, means for driving the car along its path to move the other end of the arbor into an aperture within the coil transferring machine, a tailstock adapted to clamp the said other end of the arbor as it passes through said aperture, means driving said tailstock along said first path to pull the arbor through the transferring machine, a ramp communicating between said first path and a return path, means transferring the arbor from the tailstock to the ramp whereby the arbor rolls along the ramp to the return path, and means returning the arbor to the winding machine.

16. In apparatus for automatically providing stator frames with coils including a coil transferring machine for transferring coils from a dummy field member to slots in the stator frame and a wedge inserting machine, the combination comprising: a stator frame indexer for orienting the stator in a predetermined orientation, means continuously supplying stator frames to said indexer, a first transfer head for moving the stator frames from the indexer to the coil transferring machine, and a second transfer head for moving the stator frames from the coil transferring machine to the wedge inserting machine.

17. In apparatus for automatically providing stator frames with coils including a coil transferring machine for transferring coils from a dummy field member to slots in the stator frame, the combination comprising: a stator frame indexer for orienting the stator frame in a predetermined orientation and transfer means adapted to move a stator frame from said indexer to said coil transferring machine, said transfer means including a cylinder head, a piston rod movable within said cylinder head, a transfer head mounted on the forward end of said piston rod, said transfer head having a clamp head providing a pair of opposed cylinders, clamping plungers slidably mounted within said opposed cylinders and movable radially outwardly for engagement with opposed internal surface portions of a stator frame and means forcing said plungers radially outwardly to engage a stator frame.

18. The combination of claim 17 in which said cylinder head is mounted on an arm which is supported on a rotatable pivot and means including actuator means adapted to rotate said pivot to move the transfer head from a position adjacent the indexer to a position adjacent the coil transferring machine.

19. In apparatus for automatically winding stators including a coil transferring machine for transferring coils from a dummy member into the slots of a stator frame and further including a wedge inserting apparatus for inserting coil retaining wedges into the stator slots after the coils have been inserted therein, the combination comprising: a transfer head provided with a clamp head for engagement with the internal surface of a stator frame, a cylinder head, a piston rod driven by said cylinder head and mounting said transfer head at one end thereof, a pivotally mounted support arm engaged with said cylinder head, means for pivoting said arm so as to position the transfer head selectively coaxially with a stator frame in the coil transferring machine and with a stator support head on the wedge inserting apparatus, said piston rod moving the internal clamp into a position concentric with the stator frame in the coil transferring machine when the transfer head is positioned coaxially therewith whereby the stator frame is clamped to said transfer head, the piston rod withdrawing the transfer head from the coil transferring machine whereupon said transfer head is moved in to a position coaxial with the wedge inserting apparatus and into abutment with the support head on said wedge inserting machine, a stripper plate mounted for movement coaxially with respect to said clamp head, and means for moving said stripper plate with respect to the clamp head to push the stator mounted thereon onto the support head of the wedge inserting machine.

20. The combination of claim 19 wherein the coils from a plurality of dummy field members mounted on a common arbor are consecutively transferred from each dummy field member to the stator slots, said transfer head being provided with a socket to receive one end of the arbor when the last of said dummy members is positioned within a stator frame, whereby said piston rod may move said clamp head into engagement with the last dummy member.

21. In apparatus for automatically winding stators including a coil transferring machine for transferring coils from a dummy field member to the stator frame slots, a wedge inserting machine and a coil former, the combination comprising: a transfer head adapted to engage a stator frame and transfer the stator frame from the coil transferring machine to the wedge inserting machine, another transfer head adapted to move the stator frame from the wedge inserting machine to the coil former, a pair of support arms, one for each of said transfer heads, means pivotally supporting said support arms at spaced points, and a single actuator connected with each of said arms for pivoting said arms simultaneously whereupon a stator is moved from the wedge inserting machine to the coil former simultaneously with the transfer of a stator frame from the coil inserting machine to the wedge inserting machine.

22. An indexer for orienting a stator frame having a plurality of radially spaced abutments and an aligning notch in the periphery thereof, said indexer comprising a support plate, means on said plate for supporting a stator frame for rotation about its own axis, a pivotal indexing arm mounted on said plate, a ratchet pawl on said arm adapted to engage the spaced abutments on the stator frame, a switch arm, pivot means mounting a central portion of said switch arm to said support plate, a sensing finger mounted at one end of said arm, actuator means mounted on said support plate for reciprocally pivoting said indexing arm about its pivot, whereupon the ratchet pawl on said arm sequentially engages the spaced abutments to rotate the stator frame, means biasing said sensing pin into engagement with the periphery of said stator frame as it is being rotated, whereupon the sensing pin falls into the aligning notch, and switch means engaged by said switch arm to deenergize said actuator when the sensing pin falls within the aligning notch.

23. In apparatus for automatically providing stator frames with polyphase coils in which a plurality of dummy field members used for accumulating the coils for the several phases are mounted on a common arbor, a coil winding machine loads the dummy field members with coils and a coil transferring machine transfers coils from the dummy field member to coil-receiving slots in a stator frame, the combination comprising: arbor indexing means for placing an arbor in a predetermined rotary orientation at the winding machine before coils are loaded in the dummy field member, a guide track located in a first path, said guide track having a keyway therein, means moving the arbor from the winding machine to the guide track, means controlling the rotary orientation of the arbor while being moved to the guide track, means for moving the arbor along the guide track to the coil transferring machine, said dummy members having keys slidable in said keyway for retaining the orientation of the arbor along the guide track, whereby said arbor occupies a predetermined rotary orientation when entering an aperture in the transferring machine, a stator frame indexer for placing a stator frame in a predetermined orientation, means transferring said stator frame from said indexer to the aperture in the coil transferring machine including a clamp head which controls the rotary orientation of said stator frame whereby the stator frame occupies a predetermined orientation in said coil transferring machine to receive coils from the dummy field members, means intermittently moving said arbor through the stator in said coil transferring machine whereby the dummy field members are placed concentric with said stator frame for the transfer of coils to the stator slots, means for returning the arbor to the arbor indexing means along a second path, and means for removing the stator frame provided with coils from the coil transferring machine.

References Cited by the Examiner

UNITED STATES PATENTS

| | | | |
|---|---|---|---|
| 525,697 | 9/94 | Eickemeyer | 310—195 |
| 549,234 | 11/95 | Decker | 310—195 |
| 2,627,379 | 2/53 | Moore | 252—13 |
| 2,836,204 | 5/58 | Mason | 140—92.1 |
| 2,927,679 | 3/60 | Rively | 140—71.5 XR |
| 2,969,928 | 1/61 | Larsh | 242—13 |
| 3,022,804 | 2/62 | Corp | 140—71 |
| 3,024,815 | 3/62 | Larsen | 140—71 |
| 3,036,603 | 5/62 | Moore | 140—92.1 |

CHARLES W. LANHAM, *Primary Examiner.*

RICHARD A. WAHL, *Examiner.*